(12) United States Patent
Iwasaki

(10) Patent No.: US 8,982,224 B2
(45) Date of Patent: Mar. 17, 2015

(54) IMAGE PICKUP APPARATUS, CONTROL APPARATUS, AND CONTROL METHOD FOR DISTRIBUTING CAPTURED IMAGES TO A TERMINAL VIA A NETWORK

(71) Applicant: Canon Kabushiki Kaisha, Tokyo (JP)

(72) Inventor: Takahiro Iwasaki, Kiyose (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 13/673,006

(22) Filed: Nov. 9, 2012

(65) Prior Publication Data

US 2013/0120598 A1    May 16, 2013

(30) Foreign Application Priority Data

Nov. 14, 2011    (WO) .................. PCT/JP2011/076148

(51) Int. Cl.
*H04N 5/232*    (2006.01)
*H04N 5/225*    (2006.01)

(52) U.S. Cl.
CPC ............... *H04N 5/225* (2013.01); *H04N 5/232* (2013.01)
USPC ............... 348/211.99; 348/211.4; 348/211.14

(58) Field of Classification Search
CPC .............. H04N 5/232; H04N 5/23203; H04N 5/23206; H04N 5/23225
USPC .................. 348/211.99, 211.3, 211.4, 211.8, 348/211.14
See application file for complete search history.

(56) References Cited

U.S. PATENT DOCUMENTS

| | | | |
|---|---|---|---|
| 8,405,732 B2 * | 3/2013 | Ahiska et al. ............... | 348/211.3 |
| 8,648,923 B2 * | 2/2014 | Iwasaki .................... | 348/211.99 |
| 2006/0055777 A1 * | 3/2006 | Ito et al. ......................... | 348/143 |
| 2006/0290786 A1 * | 12/2006 | Tokai ........................ | 348/211.99 |
| 2007/0113255 A1 * | 5/2007 | Kurosawa ...................... | 725/105 |
| 2007/0257990 A1 * | 11/2007 | Hayashi .................... | 348/211.99 |
| 2007/0296823 A1 * | 12/2007 | Chen et al. ............... | 348/211.99 |
| 2011/0157386 A1 * | 6/2011 | Ishii .......................... | 348/211.4 |

FOREIGN PATENT DOCUMENTS

| | | |
|---|---|---|
| JP | 2000-209575 A | 7/2000 |
| JP | 2008-153842 A | 7/2008 |
| JP | 2008-205796 A | 9/2008 |
| JP | 2010-283529 A | 12/2010 |

* cited by examiner

*Primary Examiner* — Kelly L Jerabek
(74) *Attorney, Agent, or Firm* — Canon USA, Inc., IP Division

(57) ABSTRACT

An image pickup apparatus includes image pickup means; holding means for holding a coordinate system used to represent an image capturing direction or a region in an image capturing range of the image pickup means; reception means for receiving a first command for rotating a captured image obtained by the image pickup means or a captured image cut out from the region in the image capturing range by a certain angle, a second command for rotating the coordinate system held in the holding means about the origin by the certain angle, and specification information for specifying the image capturing direction in the coordinate system; and change control means for executing control to change the image capturing direction of the image pickup means to the image capturing direction specified by the specification information.

17 Claims, 15 Drawing Sheets

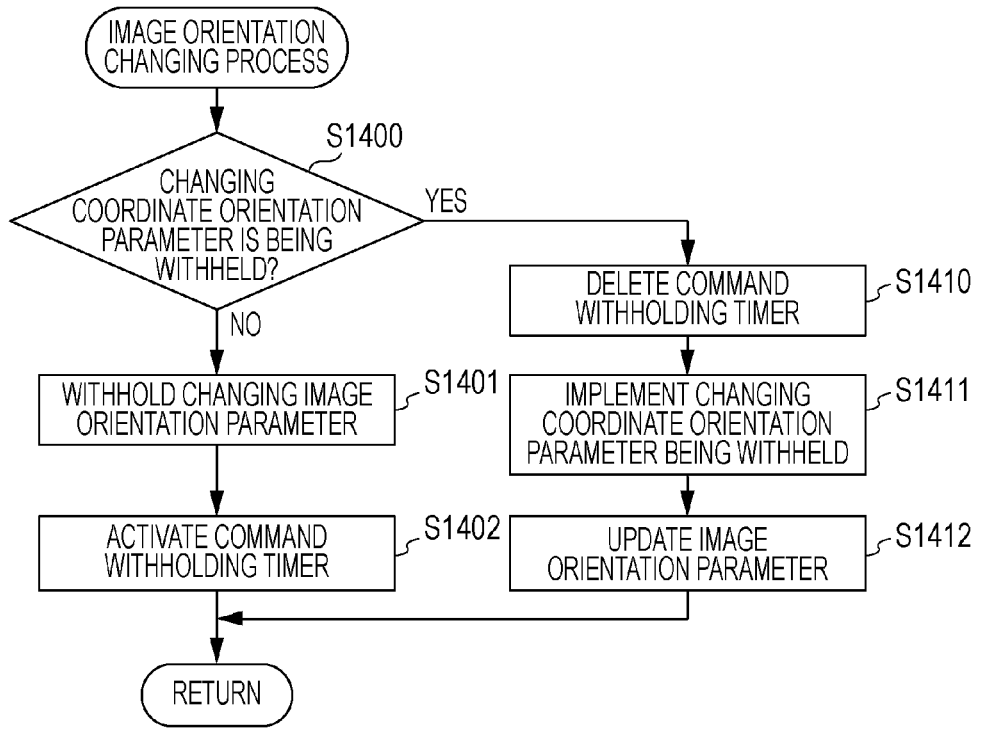
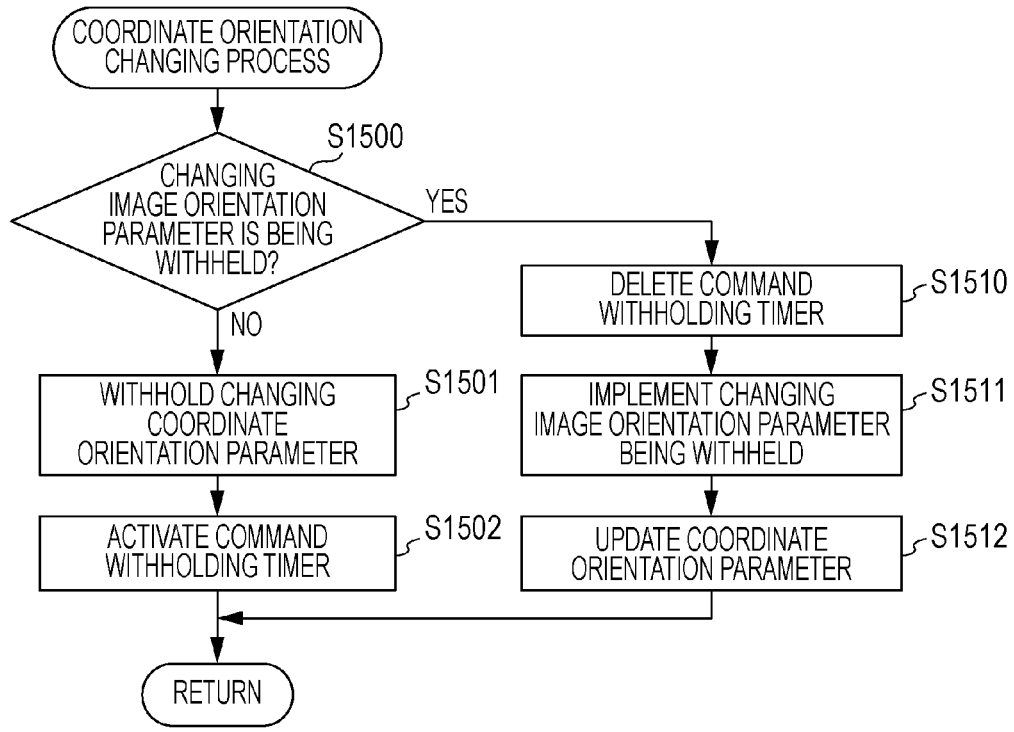

FIG. 5A

IMAGE CAPTURING RANGE CHANGING COMMAND

| DESTINATION ADDRESS | SOURCE ADDRESS | IMAGE CAPTURING RANGE CHANGING COMMAND | PANNING COORDINATE (−1.0 TO +1.0) | TILTING COORDINATE (−1.0 TO +1.0) | ZOOMING COORDINATE (0.0 TO +1.0) |
|---|---|---|---|---|---|

FIG. 5B

IMAGE ORIENTATION CHANGING COMMAND

| DESTINATION ADDRESS | SOURCE ADDRESS | IMAGE ORIENTATION CHANGING COMMAND | IMAGE ORIENTATION (OFF = NORMAL/ON = INVERTED) |
|---|---|---|---|

FIG. 5C

COORDINATE ORIENTATION CHANGING COMMAND

| DESTINATION ADDRESS | SOURCE ADDRESS | COORDINATE ORIENTATION CHANGING COMMAND | COORDINATE ORIENTATION (OFF = NORMAL/ON = INVERTED) |
|---|---|---|---|

FIG. 5D

IMAGE COORDINATE ORIENTATION CHANGING COMMAND

| DESTINATION ADDRESS | SOURCE ADDRESS | IMAGE COORDINATE ORIENTATION CHANGING COMMAND | IMAGE/COORDINATE ORIENTATIONS (OFF = NORMAL/ON = INVERTED) |
|---|---|---|---|

FIG. 5E

NORMAL RESPONSE

| DESTINATION ADDRESS | SOURCE ADDRESS | NORMAL RESPONSE |
|---|---|---|

FIG. 5F

ERROR RESPONSE

| DESTINATION ADDRESS | SOURCE ADDRESS | ERROR RESPONSE |
|---|---|---|

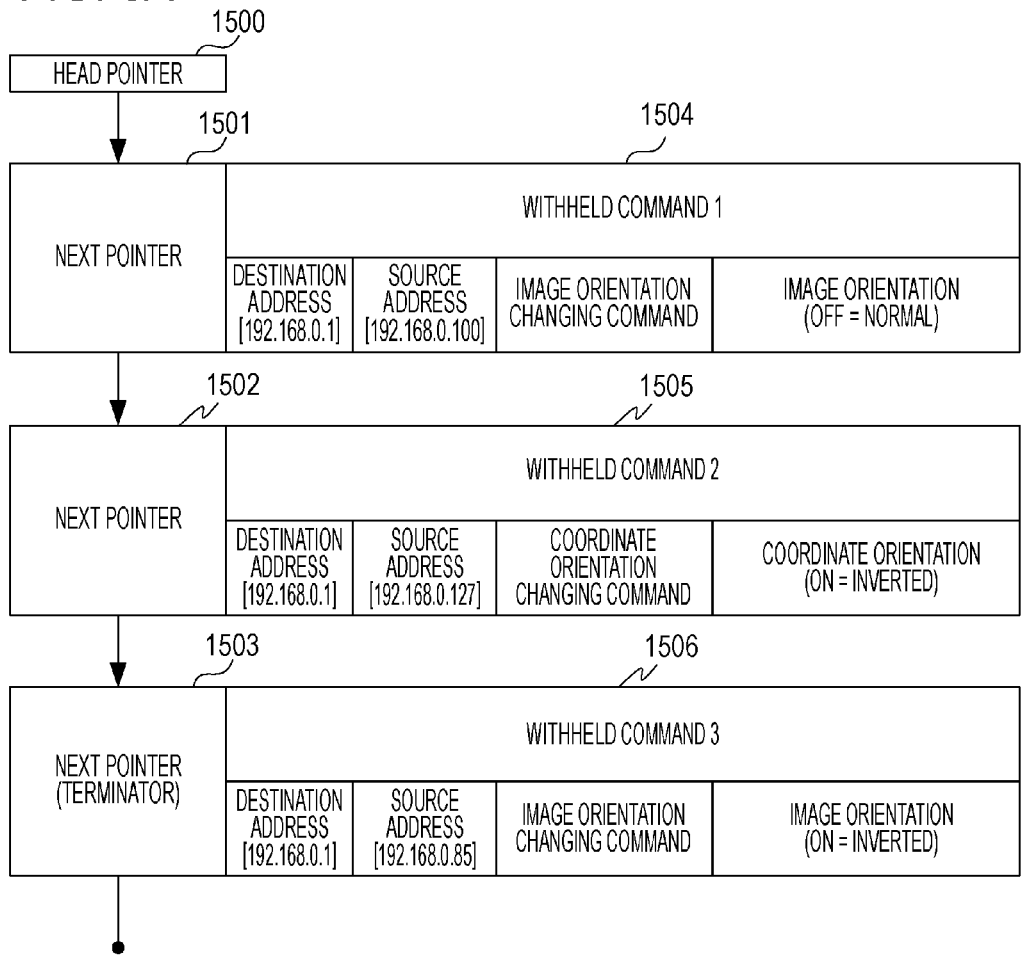

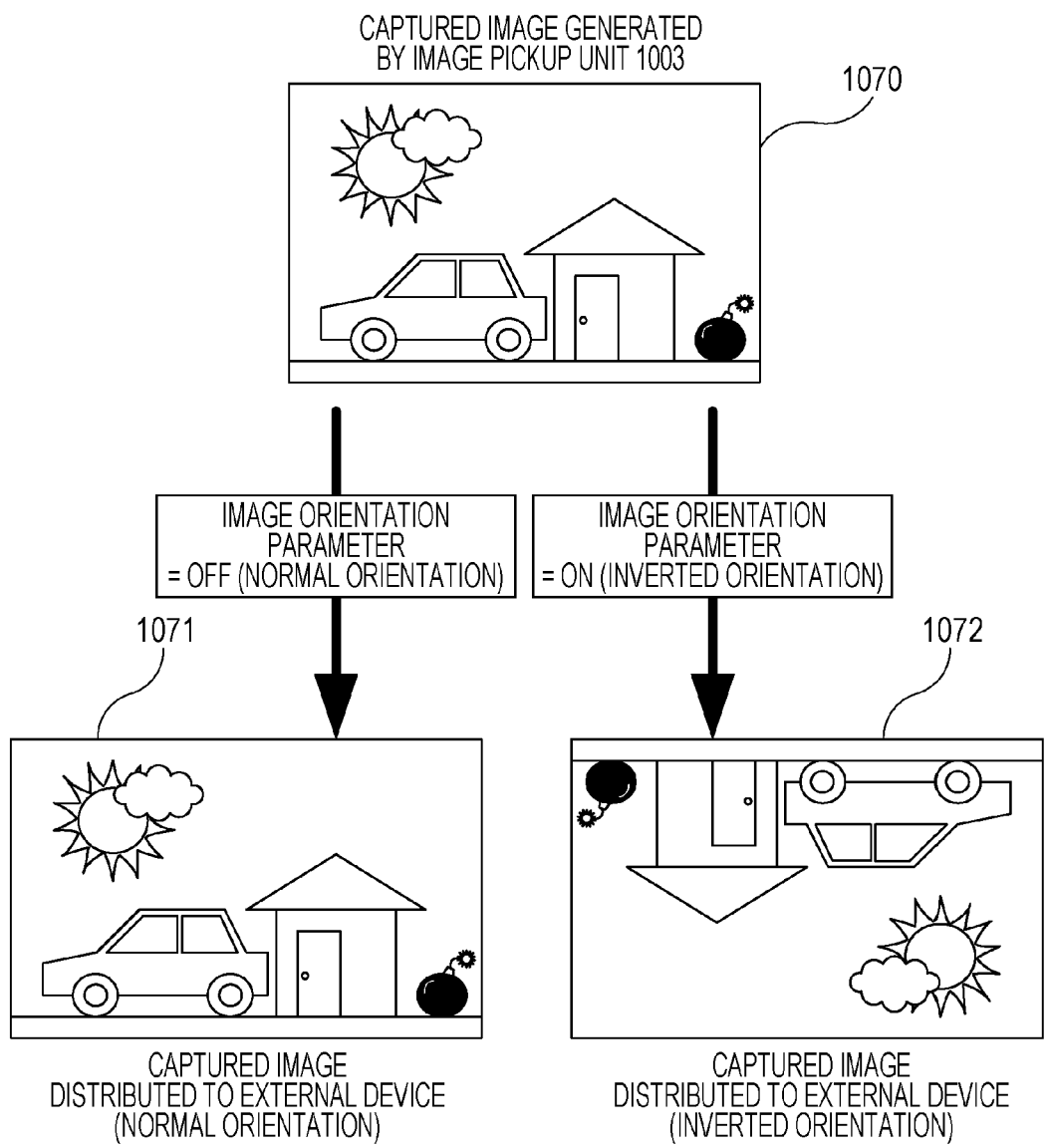

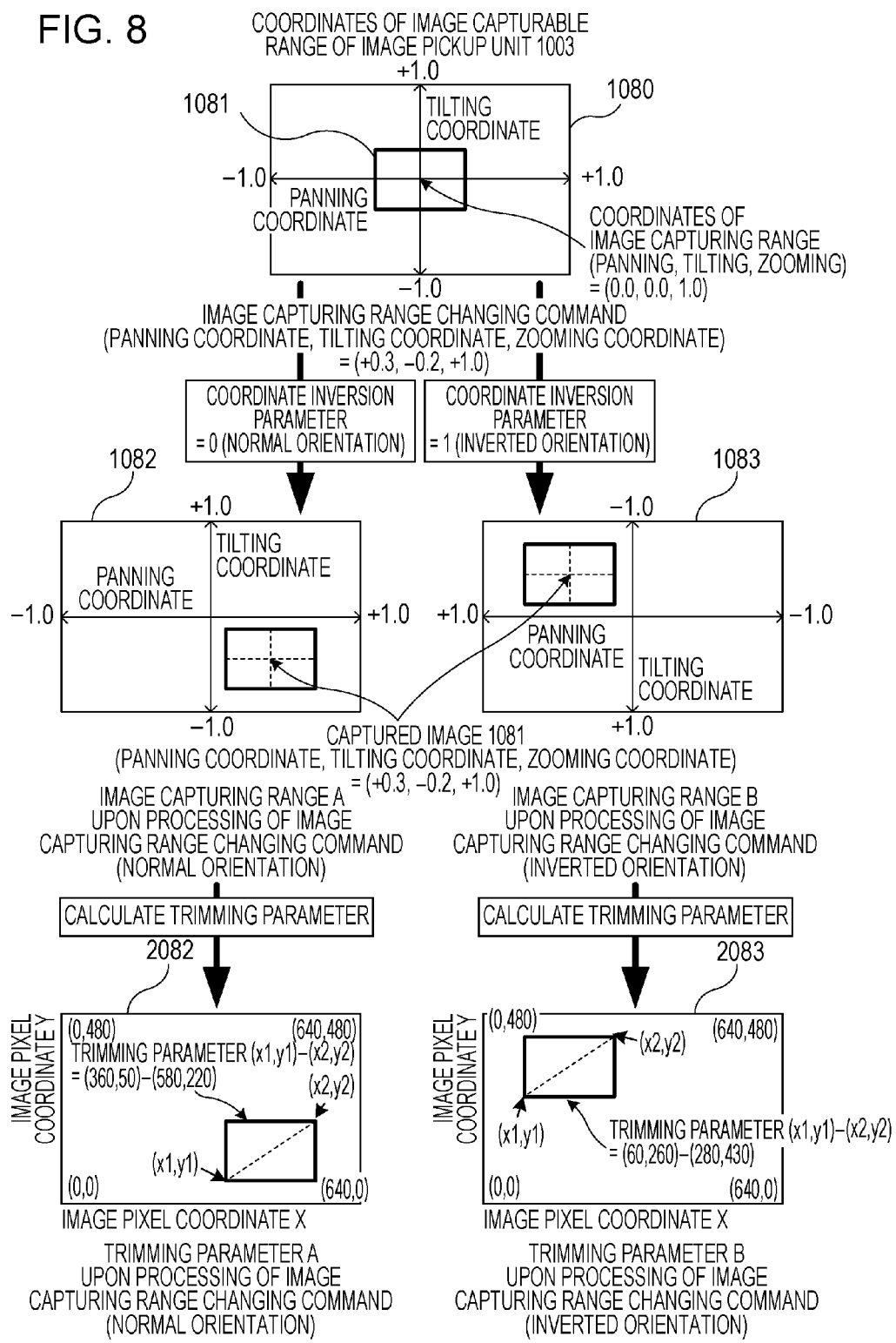

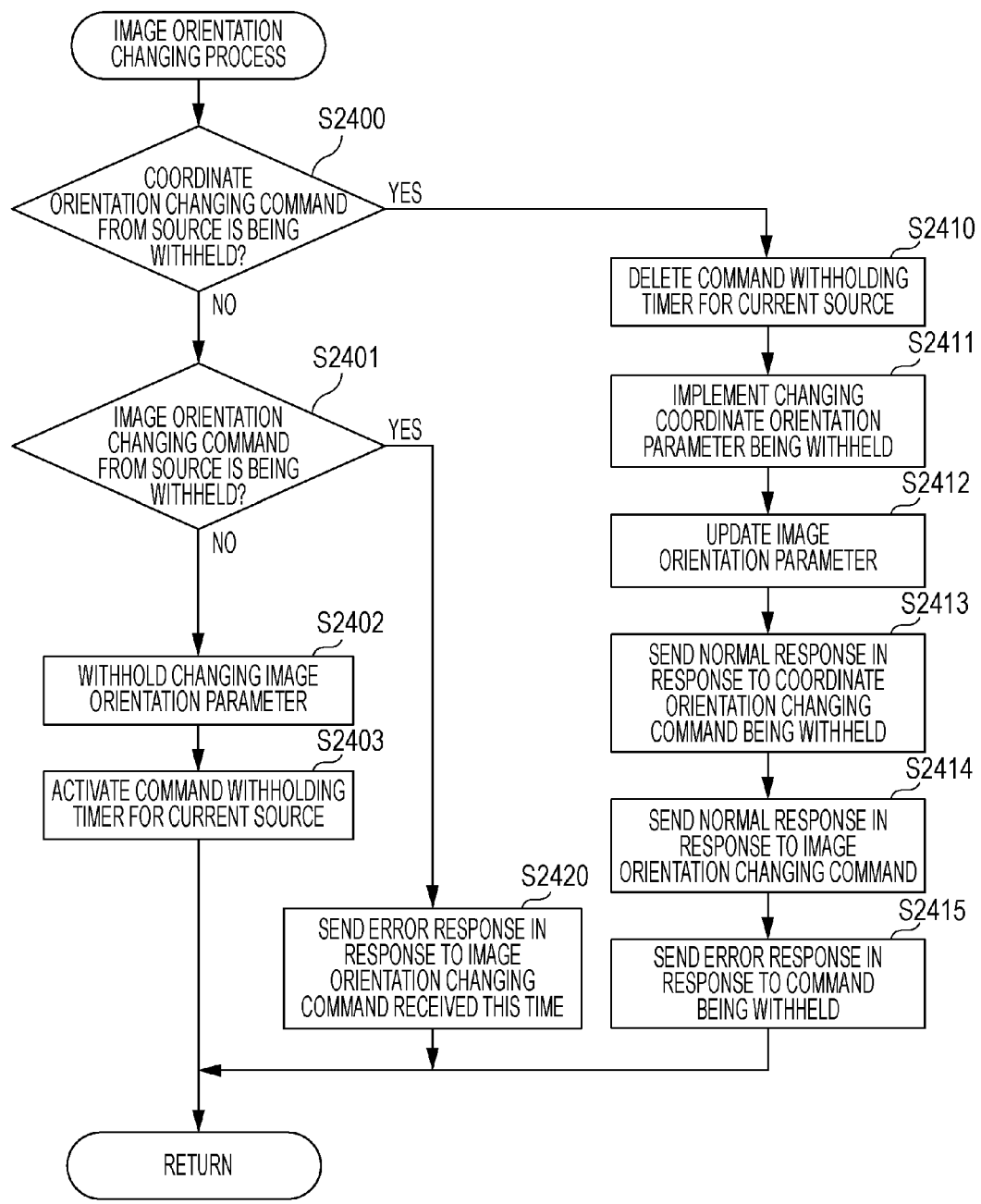

US 8,982,224 B2

IMAGE PICKUP APPARATUS, CONTROL APPARATUS, AND CONTROL METHOD FOR DISTRIBUTING CAPTURED IMAGES TO A TERMINAL VIA A NETWORK

TECHNICAL FIELD

The present invention relates to an image pickup apparatus capable of distributing a captured image to a terminal via a network, and more particularly relates to exclusion processing of plural interfaces provided by the image pickup apparatus to the terminal.

BACKGROUND ART

An image pickup apparatus that changes an image capturing direction by activating a pan head has been known. In addition, an image pickup apparatus that changes a direction in which the image pickup apparatus captures an image, in response to an instruction sent from a control apparatus connected to the image pickup apparatus via a network has been known. In these image pickup apparatuses, when the setup state of each image pickup apparatus is changed, the direction in which the image pickup apparatus captures an image in response to the same command is different before and after the change.

For example, the case in which the setup state of an image pickup apparatus is changed from a state in which the image pickup apparatus is set to be upright to a state in which the image pickup apparatus is set to be flat and placed on a ceiling or the like will be described. When a command for causing the image capturing direction of an image pickup apparatus that has been set to be upright to be directed upward is given to an image pickup apparatus that has been set to be flat, the image pickup apparatus operates so that the image capturing direction is directed downward. When the setup state of the image pickup apparatus is changed from being upright to being flat, the direction in which the image pickup apparatus captures an image in response to the same command is inverted between top and bottom and between left and right.

To this end, an image pickup system that has plural control programs for changing the direction in which an image pickup apparatus captures an image and that switches a control program to use in accordance with the setup orientation of the image pickup apparatus is known (for example, see Patent Literature). In the image pickup system, the coordinate system for representing the image capturing direction in terms of coordinates is switched by switching the control program. Accordingly, regardless of the setup state, the image capturing direction of the image pickup apparatus can always be directed to a certain direction in response to a particular command.

CITATION LIST

Patent Literature

Japanese Patent Laid-Open No. 2008-153842

When a control apparatus is to receive and display a captured image obtained by an image pickup apparatus, a change in the setup state of the image pickup apparatus also affects the orientation of the captured image displayed by the control apparatus. Therefore, it is preferable that the orientation of the obtained captured image be also changeable. For example, when the setup state of the image pickup apparatus is changed from an upright state to a flat state, top/bottom and left/right of the captured image displayed at the control apparatus are inverted. To this end, a captured image obtained by the image pickup apparatus in a flat state is rotated by 180 degrees and is displayed at the control apparatus. Accordingly, the captured image whose top/bottom and left/right are identical to those of a captured image obtained in an upright state can be displayed.

An interface for changing the orientation of a captured image displayed at the control apparatus and an interface for changing the coordinate system for controlling the above-described image capturing direction may be defined as different commands. In such an image pickup apparatus, when both of the orientation of a captured image to be displayed and the orientation of the coordinate system for controlling the image capturing direction are to be changed, the top/bottom and left/right orientation of a captured image to be displayed may not be identical to the top/bottom and left/right orientation of the coordinate system. For example, regarding a command for changing the orientation of the captured image and a command for changing the orientation of the coordinate system, when one of the commands received prior to the other is processed and the other command is unprocessed, the orientation of the captured image is not identical to the orientation of the coordinate system.

In this state, when a user looks at a distributed captured image and sends a command for changing the image capturing direction to the image pickup apparatus, there is a problem that the pan head is activated in a direction different from that expected by the user. The same or similar problem is not limited to the case in which the orientation of the captured image or the coordinate system is rotated by 180 degrees. The same or similar problem occurs in the case where the orientation of the captured image or the orientation of the coordinate system is rotated by arbitrary degrees.

SUMMARY OF INVENTION

To solve the above-described problem, an image pickup apparatus according to the present invention has, for example, the following configuration. That is, the image pickup apparatus includes image pickup means; holding means for holding a coordinate system used to represent an image capturing direction of the image pickup means; reception means for receiving a first command for rotating a captured image obtained by the image pickup means by a certain angle, a second command for rotating the coordinate system held in the holding means about the origin by the certain angle, and specification information for specifying the image capturing direction in the coordinate system; change control means for executing control to change the image capturing direction of the image pickup means to the image capturing direction specified by the specification information; and control means for withholding, from when the reception means receives one of the first command and the second command to when the reception means receives the other of the first command and the second command, execution of the first command or the second command received by the reception means.

Alternatively, an image pickup apparatus according to the present invention has, for example, the following configuration. That is, the image pickup apparatus includes image pickup means; holding means for holding a coordinate system used to represent a region in an image capturing range of the image pickup means; reception means for receiving a first command for rotating a captured image cut out from the region in the image capturing range by a certain angle, a second command for rotating the coordinate system held in the holding means about the origin by the certain angle, and specification information for specifying, in the coordinate system, a region for cutting out the captured image from the image capturing range; cut-out means for cutting out the captured image in the region in the coordinate system, the region being specified by the specification means; and control means for withholding, from when the reception means receives one of the first command and the second command to when the reception means receives the other of the first command and the second command, execution of the first command or the second command received by the reception means.

Alternatively, a control apparatus according to the present invention has, for example, the following configuration. That is, the control apparatus is a control apparatus for controlling an image pickup apparatus including holding means for holding a coordinate system used to represent an image capturing direction of image pickup means. The control apparatus includes specification means for specifying an image capturing direction in the coordinate system; and sending control means for executing control to send, to the image pickup apparatus, a first command for rotating a captured image obtained by the image pickup means in the image capturing direction specified by the specification means by a certain angle, and a second command for rotating the coordinate system held in the holding means about the origin by the certain angle. From when the sending control means receives an instruction to send one of the first command and the second command to the image pickup apparatus to when the sending control means receives an instruction to send the other of the first command and the second command to the image pickup apparatus, the sending control means withholds sending of the command specified in the instruction to be sent to the image pickup apparatus.

Alternatively, a control apparatus according to the present invention has, for example, the following configuration. That is, the control apparatus is a control apparatus for controlling an image pickup apparatus including holding means for holding a coordinate system used to represent a region in an image capturing range of image pickup means. The control apparatus includes specification means for specifying a region in the coordinate system; and sending control means for executing control to send, to the image pickup apparatus, a first command for rotating a captured image in the region in the image capturing range in accordance with the region in the coordinate system, the region being specified by the specification means, by a certain angle, and a second command for rotating the coordinate system held in the holding means about the origin by the certain angle. From when the sending control means receives an instruction to send one of the first command and the second command to the image pickup apparatus to when the sending control means receives an instruction to send the other of the first command and the second command to the image pickup apparatus, the sending control means withholds sending of the command specified in the instruction to be sent to the image pickup apparatus.

Further features of the present invention will become apparent from the following description of exemplary embodiments with reference to the attached drawings.

BRIEF DESCRIPTION OF DRAWINGS

FIG. 4C is a flowchart for describing the details of the operation of the image pickup apparatus according to the first embodiment;

FIG. 4D is a flowchart for describing the details of the operation of the image pickup apparatus according to the first embodiment;

FIG. 5A is a diagram for describing a command received by the image pickup apparatus according to the present invention;

FIG. 5B is a diagram for describing a command received by the image pickup apparatus according to the present invention;

FIG. 5C is a diagram for describing a command received by the image pickup apparatus according to the present invention;

FIG. 5D is a diagram for describing a command received by the image pickup apparatus according to the present invention;

FIG. 5E is a diagram for describing a response received by the image pickup apparatus according to the present invention;

FIG. 5F is a diagram for describing a response received by the image pickup apparatus according to the present invention;

FIG. 6A is a diagram for describing a command withholding queue stored in a memory 1002;

FIG. 6B is an example of the trimming parameter according to the present invention;

FIG. 7 is a diagram for describing inversion of the image orientation of a captured image;

FIG. 8 is a diagram for describing inversion of a coordinate system used by the image pickup apparatus;

FIG. 10A is a flowchart for describing the details of the operation of the image pickup apparatus according to the second embodiment;

DESCRIPTION OF EMBODIMENTS

Hereinafter, the present invention will be described in detail on the basis of preferred embodiments thereof. Note that the configuration discussed in the following embodiments is only exemplary, and the present invention is not limited to the illustrated configuration.

First Embodiment

Figure 1A:
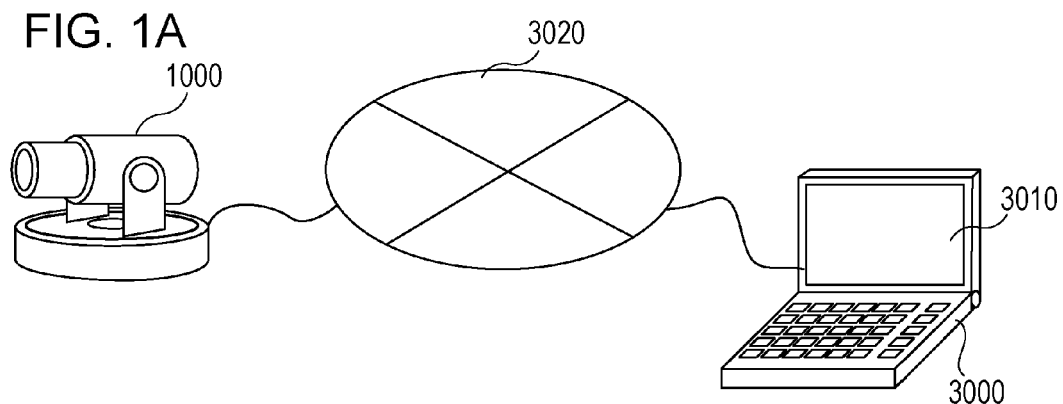
FIG. 1A is a diagram for describing the configuration of an image pickup system according to the present invention.

FIG. 1A illustrates the configuration of an image pickup system according to the present embodiment. In the image pickup system according to the present embodiment, an image pickup apparatus 1000 is connected to a client 3000 via a network 3020. The image pickup apparatus 1000 distributes a captured image obtained by the image pickup apparatus 1000 to the client 3000 via the network 3020.

The network 3020 includes plural routers, switches, and cables satisfying a communication standard such as Ethernet (registered trademark). In the present invention, any communication standard, size, and configuration may be used as long as communication can be performed between the image pickup apparatus 1000 and the client 3000. For example, the network 3020 may include the Internet, a wired LAN (Local Area Network), a wireless LAN, or a WAN (Wide Area Network).

The client 3000 sends a command to the image pickup apparatus 1000. The client 3000 sends a command for changing the image capturing direction or the angle of view of the image pickup apparatus 1000. Also, the client 3000 sends a command for rotating a coordinate system, which is used to represent a position in the image capturing range of the image pickup apparatus 1000, about the origin. Further, the client 3000 includes a display unit 3010 for displaying a captured image obtained by the image pickup apparatus 1000. The client 3000 sends a command for rotating, at the image pickup apparatus 1000, the captured image displayed on the display unit 3010.

Figure 1B:
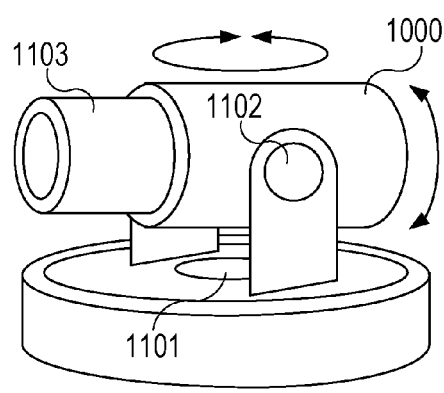
FIG. 1B is a diagram for describing the configuration of the image pickup apparatus according to the present invention.

The image pickup apparatus 1000 changes the image capturing direction in response to the command, received from the client 3000, for changing the image capturing direction. Also, the image pickup apparatus 1000 changes the angle of view in response to the command, received from the client 3000, for changing the angle of view. Using FIG. 1B, drive mechanisms for causing the image pickup apparatus 1000 according to the present embodiment to change the image capturing direction or the angle of view will be described. A panning drive mechanism 1101 changes the image capturing direction of the image pickup apparatus 1000 in a panning direction. In addition, a tilting drive mechanism 1102 changes the image capturing direction of the image pickup apparatus 1000 in a tilting direction. Further, a zooming mechanism 1103 changes the angle of view of the image pickup apparatus 1000.

Figure 2A:
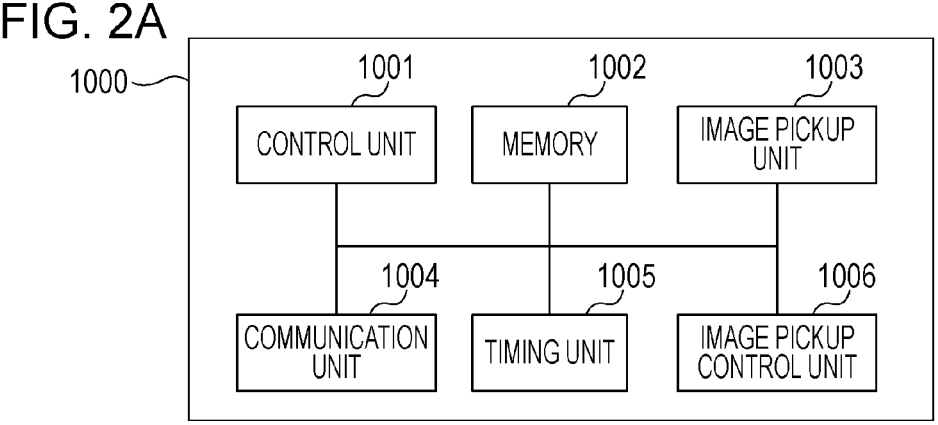
FIG. 2A is a diagram for describing the configuration of an image pickup apparatus according to the present invention.

FIG. 2A illustrates the internal configuration of the image pickup apparatus 1000 according to the present embodiment. In FIG. 2A, a control unit 1001 executes the overall control of the image pickup apparatus 1000. The control unit 1001 includes, for example, a CPU (Central Processing Unit), and executes a program stored in a memory 1002 described later.

The memory 1002 is used as a data storage region, such as a storage region of a program executed by the control unit 1001, a work region for a program being executed, or a storage region of a captured image generated by an image pickup unit 1003 described later. In addition, the memory 1002 holds the coordinate system used to represent a position in the image capturing range of the image pickup apparatus 1000. Also, the memory 1002 holds a command withholding queue for withholding the execution of a command received by a communication unit 1004 described later.

The image pickup unit 1003 captures an image of a subject and converts the obtained analog signal into digital data. Also, the image pickup unit 1003 executes data compression processing by performing, for example, ADCT (Adaptive Discrete Cosine Transform) to generate a captured image, and outputs the captured image to the memory 1002. After outputting the captured image to the memory 1002, the image pickup unit 1003 sends an image obtaining event to the control unit 1001.

The communication unit 1004 receives, from the client 3000, an image capturing range changing command illustrated in FIG. 5A, an image orientation changing command illustrated in FIG. 5B, and a coordinate orientation changing command illustrated in FIG. 5C. Upon receipt of the commands illustrated in FIGS. 5A to 5C, the communication unit 1004 sends reception events to the control unit 1001. Also, the communication unit 1004 sends responses in response to the commands illustrated in FIGS. 5A to 5C to the client 3000. In the present embodiment, the communication unit 1004 sends a normal response, which is a response for indicating that the received command is normally executed, or an error response, which is a response for indicating that the received command is not executed, to the client 3000. FIG. 5E illustrates an example of the normal response. In addition, FIG. 5F illustrates an example of the error response.

A timing unit 1005 measures a time period that has elapsed since the image pickup apparatus 1000 has received the image orientation changing command or the coordinate orientation changing command. When a certain time period has elapsed since the reception of the image orientation changing command or the coordinate orientation changing command from the client 3000, the timing unit 1005 sends a timeout event to the control unit 1001.

An image pickup control unit 1006 controls the panning drive mechanism 1101, the tilting drive mechanism 1102, and the zooming mechanism 1103 in accordance with instructions from the control unit 1001. That is, when the communication unit 1004 receives the image capturing range changing command, described later using FIG. 5A, from the client 3000, a reception event in response to the command is sent to the control unit 1001. When the control unit 1001 receives the reception event, the control unit 1001 gives a control instruction to the image pickup control unit 1006 in accordance with the contents of the reception event. Having received the control instruction, the image pickup control unit 1006 executes control to drive the panning drive mechanism 1101, the tilting drive mechanism 1102, or the zooming mechanism 1103 in accordance with the control instruction. The image pickup control unit 1006 executes change control to change the image capturing direction, in which the image pickup unit 1003 captures an image, to a position specified by the coordinates specified by the image capturing range changing command, described later using FIG. 5A, and the above-described coordinate system held in the memory 1002.

The internal configuration of the image pickup apparatus 1000 has been described above. Processing blocks illustrated in FIG. 2A describe an example of a preferred embodiment of the image pickup apparatus 1000 according to the present invention and are not limited thereto. Without departing from the scope of the gist of the present invention, various modifications and changes can be made, such as including an audio input unit.

Figure 2B:
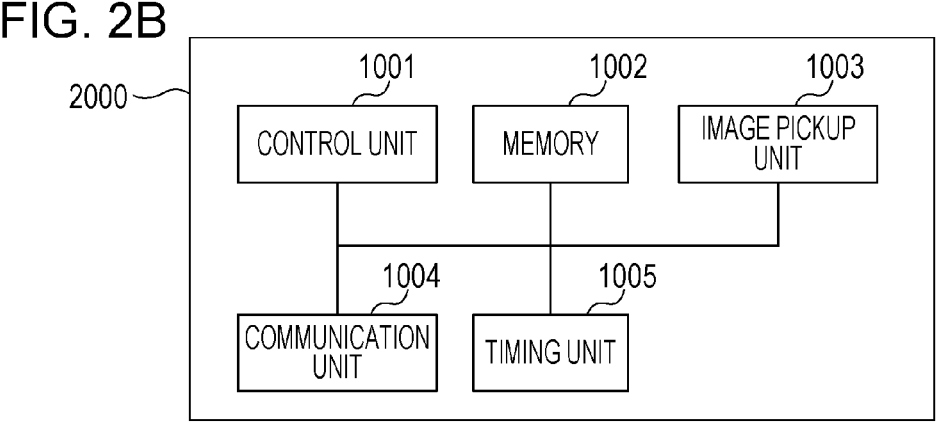
FIG. 2B is diagram for describing the configuration of an image pickup apparatus according to the present invention.
Figure 2C:
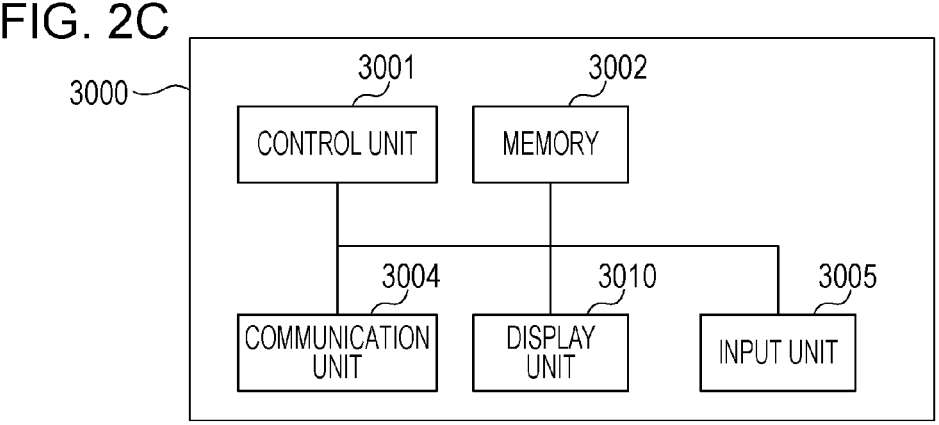
FIG. 2C is diagram for describing the configuration of a client according to the present invention.

Next, the internal configuration of the client 3000 will be described using FIG. 2C. The client 3000 is configured as a computer device connected to the network 3020. A control unit 3001 executes the overall control of the client 3000. The control unit 3001 includes, for example, a CPU (Central Processing Unit), and executes a program stored in a memory 3002 described later.

The memory 3002 is used as a storage region of a program executed by the control unit 3001, a work region for a program being executed, and a data storage region.

A communication unit 3004 receives a captured image sent from the image pickup apparatus 1000. In addition, the communication unit 3004 sends commands for controlling the image pickup apparatus 1000.

An input unit 3005 accepts input of an instruction from a user. For example, the input unit 3005 can accept, as an instruction from the user, input of an instruction to send various commands to the image pickup apparatus 1000. The details of commands for the image pickup apparatus 1000 will be described later using FIGS. 5A to 5C. When an instruction to send a command to the image pickup apparatus 1000 is input from the user, the input unit 3005 notifies the control unit 3001 of the fact that the instruction to send a command has been input. In response to the instruction input to the input unit 3005, the control unit 3001 generates a command for the image pickup apparatus 1000, and executes sending control to send the generated command to the image pickup apparatus 1000 via the communication unit 3004.

In addition, the input unit 3005 can accept input of the user's response in response to, for example, a query message for the user, which is generated by the control unit 3001 executing the program stored in the memory 3002.

The display unit 3010 displays a captured image received by the communication unit 3004. Also, the display unit 3010 can display, for example, a query message for the user, which is generated by the control unit 3001 executing the program stored in the memory 3002.

Next, commands provided by the client 3000 to the image pickup apparatus 1000 will be described using FIGS. 5A to 5C. As illustrated in FIGS. 5A to 5C, each command includes information of a destination address indicating the destination of a target who executes the command, and information of a source address indicating the source of the command. Further, each command includes information for the contents and argument(s) of the command.

Firstly, an example of the image capturing range changing command will be described using FIG. 5A. Using the image capturing range changing command, the client 3000 changes the image capturing range of the image pickup apparatus 1000. Arguments of the image capturing range changing command include a panning coordinate, a tilting coordinate, and a zooming coordinate. In the present embodiment, the client 3000 and the image pickup apparatus 1000 normalize the angle in a horizontal direction at which the image pickup apparatus 1000 can capture an image from −1.0 to +1.0. The panning direction of the image pickup apparatus 1000 is represented using a value from −1.0 to +1.0 as the panning coordinate. Similarly, the client 3000 and the image pickup apparatus 1000 normalize the angle in a vertical direction at which the image pickup apparatus 1000 can capture an image from −1.0 to +1.0. The tilting direction of the image pickup apparatus 1000 is represented using a value from −1.0 to +1.0 as the tilting coordinate.

Further in the present embodiment, the client 3000 and the image pickup apparatus 1000 normalize values in the range from the telephoto end to the wide angle end of zooming from −1.0 to +1.0. As a zooming value, for example, the value of zooming magnification or focal length can be used. The zooming position of the image pickup apparatus 1000 is represented using a value from −1.0 to +1.0 as the zooming coordinate. Using the present command, the client 3000 is capable of specifying the absolute position of the panning coordinate, the tilting coordinate, and the zooming coordinate, and arbitrarily changing the image capturing range of the image pickup apparatus 1000. The panning coordinate, the tilting coordinate, or the zooming coordinate held in the image capturing range changing command is specification information for specifying the image capturing direction in the coordinate system held in the memory 1002. Specifying the panning coordinate, the tilting coordinate, and the zooming coordinate is not limited to the above-described case in which normalized values are used. For example, the panning coordinate or the tilting coordinate may be specified by the angle of movement from a reference position (such as the panning end or the tilting end) in the movable range of the panning drive mechanism 1101 or the tilting drive mechanism 1102. Also, the zooming coordinate may be specified by the value of zooming magnification or focal length.

Next, an example of the image orientation changing command will be described using FIG. 5B. Using the image orientation changing command, the client 3000 rotates the orientation of a captured image distributed by the image pickup apparatus 1000 by a certain angle (180 degrees in the present embodiment). The image pickup apparatus 1000 is capable of rotating the orientation of a captured image, with the point of intersection of diagonals of the captured image being the center of rotation. An argument of the image orientation changing command is an image orientation. In the present embodiment, OFF indicates a normal orientation, and ON indicates an inverted orientation. The normal orientation and the inverted orientation of a captured image will be described using FIG. 7.

In FIG. 7, a captured image 1070 is a captured image obtained by the image pickup unit 1003 of the image pickup apparatus 1000. A captured image 1071 indicates a captured image distributed to the client 3000 when OFF (normal orientation) is specified by the image orientation changing command illustrated in FIG. 5B. When OFF (normal orientation) is specified by the image orientation changing command, the image pickup apparatus 1000 sends the captured image 1071, whose image orientation is the same as that of the captured image 1070, to the client 3000. Also, a captured image 1072 indicates a captured image distributed to the client 3000 when ON (inverted orientation) is specified by the image orientation changing command illustrated in FIG. 5B. When ON (inverted orientation) is specified by the image orientation changing command, the image pickup apparatus 1000 in the present embodiment sends the captured image 1072, whose top/bottom and left/right are inverted from the captured image 1070, to the client 3000.

In this manner, when the image orientation changing command illustrated in FIG. 5B is received, the image pickup apparatus 1000 rotates (180-degree inversion in the present embodiment) a captured image being obtained by the image pickup unit 1003, and sends the rotated captured image to the client 3000.

Next, an example of the coordinate orientation changing command will be described using FIG. 5C. Using the coordinate orientation changing command, the client 3000 is capable of rotating the orientation of the coordinate system, used to represent a position in the image capturing range of the image pickup apparatus 1000, by a certain angle (180 degrees in the present embodiment). Using the coordinate orientation changing command, the client 3000 is capable of rotating the orientation of the coordinate system by the same angle as that by which a captured image can be rotated in response to the above-described image orientation changing command. When the image pickup apparatus 1000 receives the coordinate orientation changing command, the image pickup apparatus 1000 rotates the orientation of the coordinate system by, for example, the origin of the coordinate system. An argument of the coordinate orientation changing command is a coordinate orientation. OFF indicates a normal orientation, and ON indicates an inverted orientation. The normal orientation and the inverted orientation of the coordinate orientation will be described using FIG. 8.

In FIG. 8, coordinates 1080 indicate the image capturable range of the image pickup unit 1003 of the image pickup apparatus 1000. At the coordinates 1080, as has been described above, the ranges of the panning coordinate and the tilting coordinate are normalized from −1.0 to +1.0. An image capturing range 1081 indicates the image capturing range of the image pickup unit 1003 at present in the image capturable range. At the coordinates 1080, the panning coordinate, the tilting coordinate, and the zooming coordinate are set to (0.0, 0.0, 1.0), respectively.

Coordinates 1082 and coordinates 1083 each indicate the case in which, in response to the image capturing range changing command illustrated in FIG. 5A, the panning coordinate, the tilting coordinate, and the zooming coordinate of the image capturing range 1081 are changed to (0.3, −0.2, 1.0), respectively.

The coordinates 1082 indicate the image capturing range in the case in which the normal coordinate orientation is selected as the argument of the coordinate orientation changing command illustrated in FIG. 5C. When the normal coordinate orientation is selected as the argument of the coordinate orientation changing command, the image pickup apparatus 1000 holds the coordinate system with the same orientation as that of the coordinates 1080.

In contrast, the coordinates 1083 indicate the image capturing range 1081 in the case in which the inverted coordinate orientation is selected as the argument of the coordinate orientation changing command illustrated in FIG. 5C. When the inverted coordinate orientation is selected as the argument of the coordinate orientation changing command, the image pickup apparatus 1000 rotates the coordinate system of the coordinates 1080 (180-degree inversion in the present embodiment).

With respect to the coordinates 1082, the coordinates 1083 are such that the coordinate system indicating the image capturable range has been rotated (180-degree inverted). Therefore, at the coordinates 1082 and the coordinates 1083, when the panning coordinate, the tilting coordinate, and the zooming coordinate of the image capturing range 1081 are changed to (0.3, −0.2, 1.0), the position of the image capturing range 1081 in which the image pickup apparatus 1000 captures an image in the image capturable range is different.

When the individual commands illustrated in FIGS. 5A to 5C are received by the communication unit 1004, each command is placed in a command withholding queue stored in the memory 1002, and execution of the command is withheld for a time. An example of the command withholding queue stored in the memory 1002 will be described using FIG. 6A. The command withholding queue includes, as elements, a head pointer 1500, next pointers 1501 to 1503, and withheld commands 1504 to 1506. The command withholding queue in FIG. 6A withholds three commands. The head pointer 1500 points to the first element including the next pointer 1501 and the withheld command 1504. The next pointer 1501 of the first element points to the second element including the next pointer 1502 and the withheld command 1505. Similarly, the next pointer 1502 points to the third element including the next pointer 1503 and the withheld command 1506. A terminator is written in the next pointer 1503 in the third element at the end, thereby indicating the end of the queue. In the withheld commands 1504 to 1506 of the individual elements, each command's destination address, source address, and the commands illustrated in FIGS. 5A to 5C are stored.

Next, the operation of the image pickup apparatus 1000 according to the present embodiment will be described using the flowcharts illustrated in FIG. 3 and FIGS. 4A to 4D. In a configuration in which the control unit 1001 of the image pickup apparatus 1000 includes a processor, the processing flow illustrated in FIG. 3 and FIGS. 4A to 4D indicates a program for causing the control unit 1001 to execute procedures illustrated in FIG. 3 and FIGS. 4A to 4D. The processor included in the control unit 1001 of the image pickup apparatus 1000 is a computer, and the processor executes a program read from the built-in memory 1002 included in the image pickup apparatus 1000.

Figure 3:
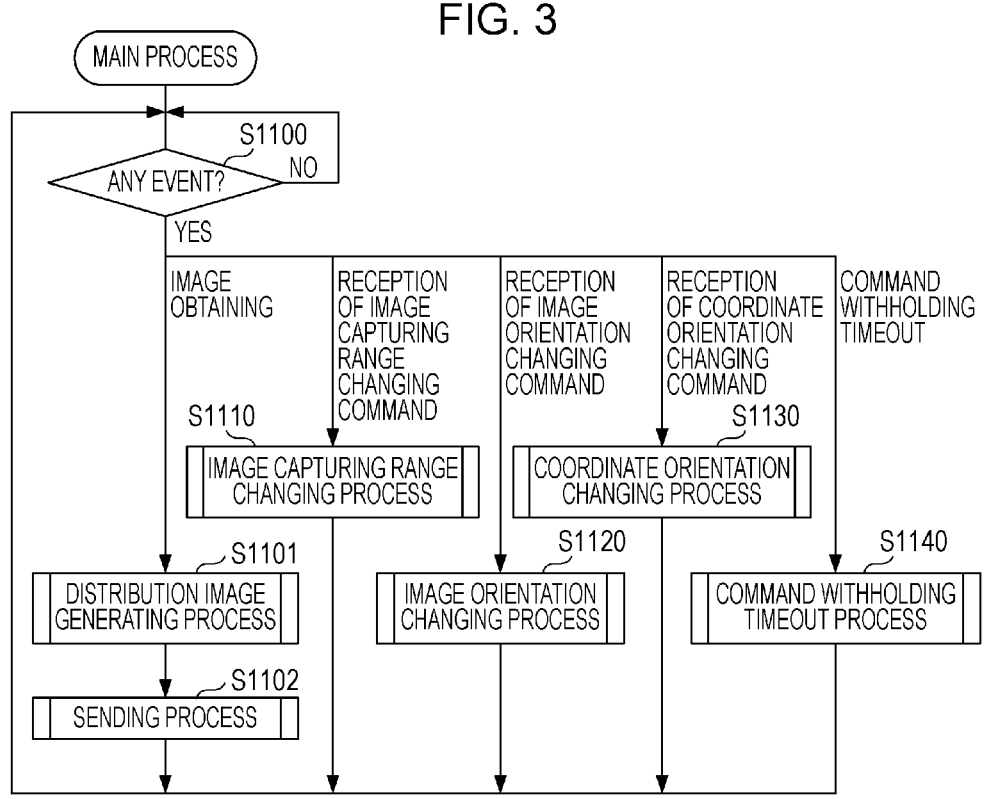
FIG. 3 is a flowchart for describing the operation of an image pickup apparatus according to a first embodiment.

A main process executed by the image pickup apparatus 1000 will be described using FIG. 3. At first, the control unit 1001 waits for an event (S1100). In the present embodiment, the image pickup apparatus 1000 determines that there is an event when an event of image obtaining, reception of the image capturing range changing command, reception of the image orientation changing command, reception of the coordinate orientation changing command, or command withholding timeout occurs.

When an image obtaining event occurs, the image pickup apparatus 1000 executes processing in steps S1101 to S1102. Here, an image obtaining event is an event that occurs when the image pickup apparatus 1000 receives, from the client 3000, an image obtaining request for obtaining a captured image obtained by the image pickup apparatus 1000.

When an image obtaining event occurs, the control unit 1001 of the image pickup apparatus 1000 executes a distribution image generating process (S1101). The details of the distribution image generating process will be described later using FIG. 4A.

When the distribution image generating process is completed, the control unit 1001 executes a sending process (S1102). In the sending process, the control unit 1001 sends a distribution image generated in the distribution image generating process in step S1101 via the communication unit 1004 to the client 3000 requesting video distribution from the image pickup apparatus 1000. After executing the sending process, the control unit 1001 returns to step S1100 and executes processing.

Figure 4A:
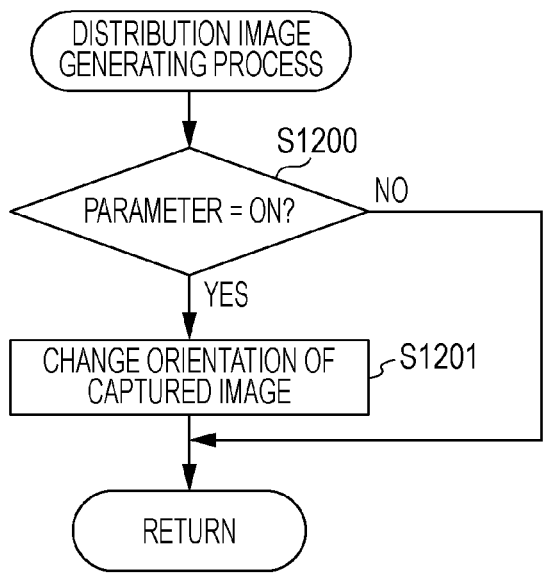
FIG. 4A is a flowchart for describing the details of the operation of the image pickup apparatus according to the first embodiment.
Figure 4B:
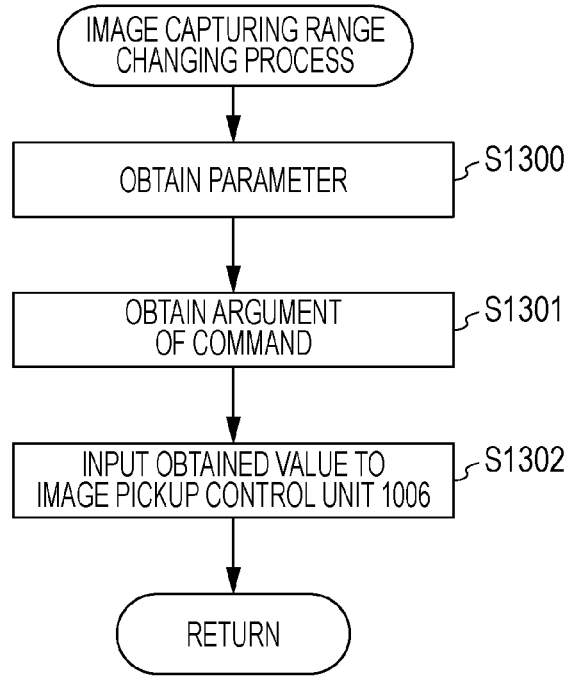
FIG. 4B is a flowchart for describing the details of the operation of the image pickup apparatus according to the first embodiment.

Alternatively, when the control unit 1001 of the image pickup apparatus 1000 receives, from the client 3000, the image capturing range changing command illustrated in FIG. 5A, the control unit 1001 executes an image capturing range changing process described later using FIG. 4B (S1110).

Alternatively, when the control unit 1001 receives, from the client 3000, the image orientation changing command illustrated in FIG. 5B, the control unit 1001 executes an image orientation changing process described later using FIG. 4C (S1120).

Alternatively, when the control unit 1001 receives, from the client 3000, the coordinate orientation changing command illustrated in FIG. 5C, the control unit 1001 executes a coordinate orientation changing process described later using FIG. 4D (S1130).

Alternatively, when a certain time period has elapsed since the received command was withheld in the memory 1002, the control unit 1001 executes a command withholding timeout process described later (S1140).

When the processing in step S1110, step S1120, step S1130, or step S1140 ends, the control unit 1001 returns to step S1100 and executes processing.

Next, the distribution image generating process in step S1101 will be described using FIG. 4A. The control unit 1001 refers to the memory 1002, and determines an image orientation parameter (S1200). When the image orientation parameter is ON (Yes in S1200), the control unit 1001 inverts (180-degree rotation) the captured image, as indicated by the captured image 1072 illustrated in FIG. 7, overwrites the captured image stored in the memory 1002, and ends the distribution image generating process (S1201). When the image orientation parameter is OFF (No in S1200), the control unit 1001 does not execute the processing, and ends the distribution image generating process.

Next, the image capturing range changing process in step S1110 will be described using FIG. 4B. The control unit 1001 refers to the memory 1002, and obtains a coordinate orientation parameter of the coordinate orientation changing command illustrated in FIG. 5C (S1300). Further, the control unit 1001 refers to the memory 1002, and obtains the arguments (panning coordinate, tilting coordinate, and zooming coordinate) of the image capturing range changing command illustrated in FIG. 5A (S1301).

The control unit 1001 inputs the obtained coordinate orientation parameter, and the panning coordinate, tilting coordinate, and zooming coordinate to the image pickup control unit 1006 (S1302). Accordingly, when the coordinate orientation parameter is ON (inverted orientation), the image pickup control unit 1006 inverts the coordinate system, as in the coordinates 1083 illustrated in FIG. 8, and operates the image capturing direction of the image pickup unit 1003. In contrast, when the coordinate orientation parameter is OFF (normal orientation), the image pickup control unit 1006 does not invert the coordinate system, as in the coordinates 1082 illustrated in FIG. 8, and operates the image capturing direction of the image pickup unit 1003. In the above manner, the control unit 1001 ends the image capturing range changing process.

Next, the image orientation changing process in step S1120 will be described using FIG. 4C. The control unit 1001 refers to the command withholding queue stored in the memory 1002 illustrated in FIG. 6A, and determines whether the memory 1002 is withholding the execution of the coordinate orientation changing command (S1400). When the memory 1002 is not withholding the execution of the coordinate orientation changing command (No in S1400), the control unit 1001 stores the argument of the received image orientation changing command in the command withholding queue, and withholds the execution of the image orientation changing command (S1401).

The control unit 1001 uses the timing unit 1005 to activate a command withholding timer (S1402). The command withholding timer is a timer for withholding the execution of a command for a certain time period after the reception of the command. A timer value of the command withholding timer may be set in advance by a user, and may be about a few hundred milliseconds to about a few seconds. Upon activation of the command withholding timer, the control unit 1001 ends the image orientation changing process.

When the control unit 1001 receives the image orientation changing command in a state in which no coordinate orientation changing command has been received as above, the control unit 1001 withholds the execution of the image orientation changing command. That is, the execution of the image orientation changing command is withheld from reception of the image orientation changing command to reception of the coordinate orientation changing command. Thus, the inconsistency between the coordinate orientation (normal orientation/inverted orientation) and the image orientation (normal orientation/inverted orientation) of the captured image, which is caused by changing only the image orientation (captured image 1072 illustrated in FIG. 7) while keeping the coordinate orientation unchanged (coordinates 1082 illustrated in FIG. 8), can be prevented.

In contrast, when the memory 1002 is withholding the coordinate orientation changing command (Yes in S1400), the control unit 1001 deletes the command withholding timer (S1410). The control unit 1001 reads the argument of the coordinate orientation changing command, whose processing has been withheld, from the command withholding queue, and changes the coordinate orientation parameter in the memory 1002 (S1411). Then, the control unit 1001 reads the argument of the received image orientation changing command, and changes the image orientation parameter in the memory 1002 (S1412). Upon completion of the processing in step S1412, the control unit 1001 ends the image orientation changing process.

When the control unit 1001 receives the image orientation changing command in a state in which the execution of the coordinate orientation changing command has been withheld in the memory 1002, the control unit 1001 executes the coordinate orientation changing command and the image orientation changing command. Accordingly, the image pickup apparatus 1000 can output the captured image whose image orientation has been changed (captured image 1072 illustrated in FIG. 7), and change the image capturing range on the basis of the changed coordinates (coordinates 1083 illustrated in FIG. 8). Thus, the captured image can be output in a state in which the image orientation (normal orientation/inverted orientation) and the coordinate orientation (normal orientation/inverted orientation) match each other, and the image capturing range can be changed.

In this manner, the image pickup apparatus 1000 can execute the image orientation changing command while controlling the image capturing direction and the coordinate orientation to always match each other.

Next, the coordinate orientation changing process in step S1130 will be described using FIG. 4D. The control unit 1001 refers to the command withholding queue in the memory 1002, and determines whether the memory 1002 is withholding the execution of the image orientation changing command (S1500). When the memory 1002 is not withholding the execution of the image orientation changing command (No in S1500), the control unit 1001 stores the argument of the received coordinate orientation changing command in the command withholding queue, and withholds the execution of the coordinate orientation changing command (S1501). The control unit 1001 uses the timing unit 1005 to activate the command withholding timer (S1502).

When the control unit 1001 receives the coordinate orientation changing command in a state in which no image orientation changing command has been received as above, the control unit 1001 withholds the execution of the coordinate orientation changing command. That is, the control unit 1001 withholds the execution of the coordinate orientation changing command from reception of the coordinate orientation changing command to reception of the image orientation changing command. Thus, the inconsistency between the coordinate orientation (normal orientation/inverted orientation) and the image orientation (normal orientation/inverted orientation) of the captured image, which is caused by changing only the coordinate orientation (coordinates 1082 illustrated in FIG. 8) while keeping the image orientation unchanged (captured image 1072 illustrated in FIG. 7), can be prevented.

In contrast, when the memory 1002 is withholding the image orientation changing command (Yes in S1500), the control unit 1001 deletes the command withholding timer (S1510). The control unit 1001 reads the argument of the image orientation changing command, whose processing has been withheld, from the command withholding queue, and changes the coordinate orientation parameter in the memory 1002 (S1511). Then, the control unit 1001 reads the argument of the received coordinate orientation changing command, and changes the coordinate orientation parameter in the memory 1002 (S1512). The control unit 1001 ends the coordinate orientation changing process.

When the control unit 1001 receives the coordinate orientation changing command in a state in which the execution of the image orientation changing command has been withheld in the memory 1002, the control unit 1001 executes the image orientation changing command and the coordinate orientation changing command. Accordingly, the image pickup apparatus 1000 can output the captured image whose image orientation has been changed (captured image 1072 illustrated in FIG. 7), and change the image capturing range on the basis of the changed coordinates (coordinates 1083 illustrated in FIG. 8). Thus, the captured image can be output in a state in which the image orientation (normal orientation/inverted orientation) and the coordinate orientation (normal orientation/inverted orientation) match each other, and the image capturing range can be changed.

In this manner, the image pickup apparatus 1000 can execute the coordinate orientation changing command while controlling the image orientation and the coordinate orientation to always match each other.

Next, the command withholding timeout process in step S1140 will be described. The control unit 1001 refers to the command withholding queue in the memory 1002 and deletes a command(s) withheld in the queue. The control unit 1001 ends the command withholding timeout process.

Accordingly, even when a certain time period has elapsed after one of the image orientation changing command and the coordinate orientation changing command is received, if the other command is not received, the control unit 1001 does not execute the received command. Thus, because execution of only one of the image orientation changing command and the coordinate orientation changing command does not occur, the inconsistency between the orientation (normal orientation/inverted orientation) of the coordinate system of the image pickup apparatus 1000 and the image orientation (normal orientation/inverted orientation) of the captured image can be prevented.

In this manner, the image pickup apparatus 1000 can execute the coordinate orientation changing command while controlling the image capturing direction and the coordinate orientation to always match each other.

The image pickup apparatus 1000 according to the present embodiment can prevent a state in which only one of the image orientation and the coordinate orientation is changed. Accordingly, when the user changes the image capturing range while looking at the captured image distributed from the image pickup apparatus 1000, the orientation of the distributed captured image and the orientation in a command for changing the image capturing range are controlled to match each other. Thus, changes in the image capturing range in accordance with the user's intention can be realized.

Also in the command timeout process, even when a certain time period has elapsed since the reception of one of the image orientation changing command and the coordinate orientation changing command, if the other command is not received, the control unit 1001 may execute the withheld command. In this way, when the user wants to execute one of the image orientation changing command and the coordinate orientation changing command, the command can be executed after a certain time period has elapsed since the reception of the command. Alternatively, when the user wants to execute both of the image orientation changing command and the coordinate orientation changing command, the inconsistency between the orientation of the coordinate system of the image pickup apparatus 1000 and the image orientation of the captured image can be prevented in a period from reception of one command to reception of the other command.

In addition, in response to each of the commands illustrated in FIGS. 5A to 5C described in the first embodiment, a normal response or an error response may be sent to the client 3000 at the requesting source. That is, when the image pickup apparatus 1000 normally executes a command from the client 3000, the image pickup apparatus 1000 sends a normal response to the client 3000 at the source requesting the command. Alternatively, when the image pickup apparatus 1000 does not normally execute a command from the client 3000, the image pickup apparatus 1000 sends an error response to the client 3000 at the source requesting the command. In this way, the client 3000 can more easily understand the processing result and processing timing of each command.

In addition, while the execution of one of the image orientation changing command and the coordinate orientation changing command is being withheld, when the same command is received again or when the other command is received from another client 3000 different from the source requesting the withheld command, error responses may be given in response to these commands.

While the execution of the image orientation changing command or the coordinate orientation changing command is being withheld as above, when a third command whose contents are the same as those of the command withheld by receiving means is received, the control unit 1001 can refrain from executing the third command.

Also in this manner, from when the communication unit 1004 receives one of the image orientation changing command and the coordinate orientation changing command from a first control apparatus to when the communication unit 1004 receives the other command from the first control apparatus, it is possible to refrain from executing a command received from a second control apparatus.

Alternatively, while the execution of one of the image orientation changing command and the coordinate orientation changing command is being withheld, when the same command is received again, an error response may be given in response to the withheld command, and these commands may be discarded. The again-received command may be withheld until the other command is received.

While the execution of the image orientation changing command or the coordinate orientation changing command is being withheld as above, when the communication unit 1004 receives a third command whose contents are the same as those of the withheld command, the control unit 1001 does not execute the withheld image orientation changing command or coordinate orientation changing command, and the control unit 1001 can refrain from executing the third command until the other command is received.

Also in the present embodiment, the case in which the image orientation changing command and the coordinate orientation changing command are separately defined has been described. In addition to these commands, a command for changing both of the image orientation and the coordinate orientation, such as that illustrated in FIG. 5D, may be defined.

Second Embodiment

In a second embodiment, the case in which the present invention is applied to an image pickup apparatus 2000 with the so-called digital PTZ (Pan Tilt Zoom) function, which changes a captured image displayed on a client 3000 by changing a region for trimming the captured image, will be described.

Figure 1C:
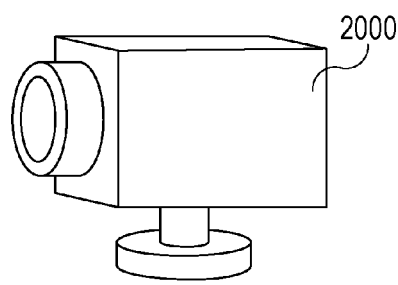
FIG. 1C is a diagram for describing the configuration of the image pickup apparatus according to the present invention.

FIG. 1C illustrates an image pickup apparatus 2000 according to the second embodiment. The image pickup apparatus 2000 according to the present embodiment does not include the panning drive mechanism 1101, the tilting drive mechanism 1102, and the zooming mechanism 1103.

Next, the internal configuration of the image pickup apparatus 2000 will be described using FIG. 2B. Compared with the image pickup apparatus 1000 according to the first embodiment, the image pickup apparatus 2000 does not include the image pickup control unit 1006. The control unit 1001 of the image pickup apparatus 2000 generates a cut-out captured image by cutting out a portion of a captured image obtained by the image pickup unit 1003, and sends the cut-out captured image to the client 3000 via the communication unit 1004.

The image pickup apparatus 2000 according to the second embodiment receives, as a trimming parameter, an instruction for the cut-out position of the captured image from the client 3000. The trimming parameter is a parameter for specifying a portion to be trimmed from the captured image generated by the image pickup unit 1003 and to be distributed to the client 3000. An example of the trimming parameter will be described using FIG. 6B. The trimming parameter illustrated in FIG. 6B includes two points (x1, y1) and (x2, y2) represented by the X-coordinates indicating the horizontal direction of the captured image and the Y-coordinates indicating the vertical direction of the captured image. A rectangle having these two points as opposite angles indicates the range to be trimmed.

Further, the image pickup apparatus 2000 according to the second embodiment can receive an image coordinate orientation changing command from the client 3000. FIG. 5D illustrates an example of the image coordinate orientation changing command. Using the image coordinate orientation changing command, the client 3000 can change the orientation of the captured image distributed by the image pickup apparatus 2000, together with the orientation of the coordinates of the image capturable range. The details of changing the image orientation and changing the coordinate orientation are the same as or similar to the contents described using FIGS. 5B and 5C in the first embodiment, and a description thereof will be omitted.

In the second embodiment, when the image pickup apparatus 2000 normally processes a command from the client 3000, the image pickup apparatus 2000 sends a normal response to the client 3000 at the source requesting the command. Alternatively, when the image pickup apparatus 2000 does not normally process a command from the client 3000, the image pickup apparatus 2000 sends an error response to the client 3000 at the source requesting the command. FIG. 5E illustrates an example of the normal response. FIG. 5F illustrates an example of the error response.

Next, the operation of the image pickup apparatus 2000 according to the second embodiment will be described using the flowcharts illustrated in FIG. 9 and FIGS. 10A to 10C. In the configuration in which the control unit 1001 of the image pickup apparatus 2000 includes the processor, the processing flow illustrated in FIG. 9 and FIGS. 10A to 10C indicates a program for causing the control unit 1001 to execute procedures illustrated in FIG. 9 and FIGS. 10A to 10C. The processor included in the control unit 1001 of the image pickup apparatus 2000 is a computer, and the processor executes a program read from the built-in memory 1002 included in the image pickup apparatus 2000.

Figure 9:
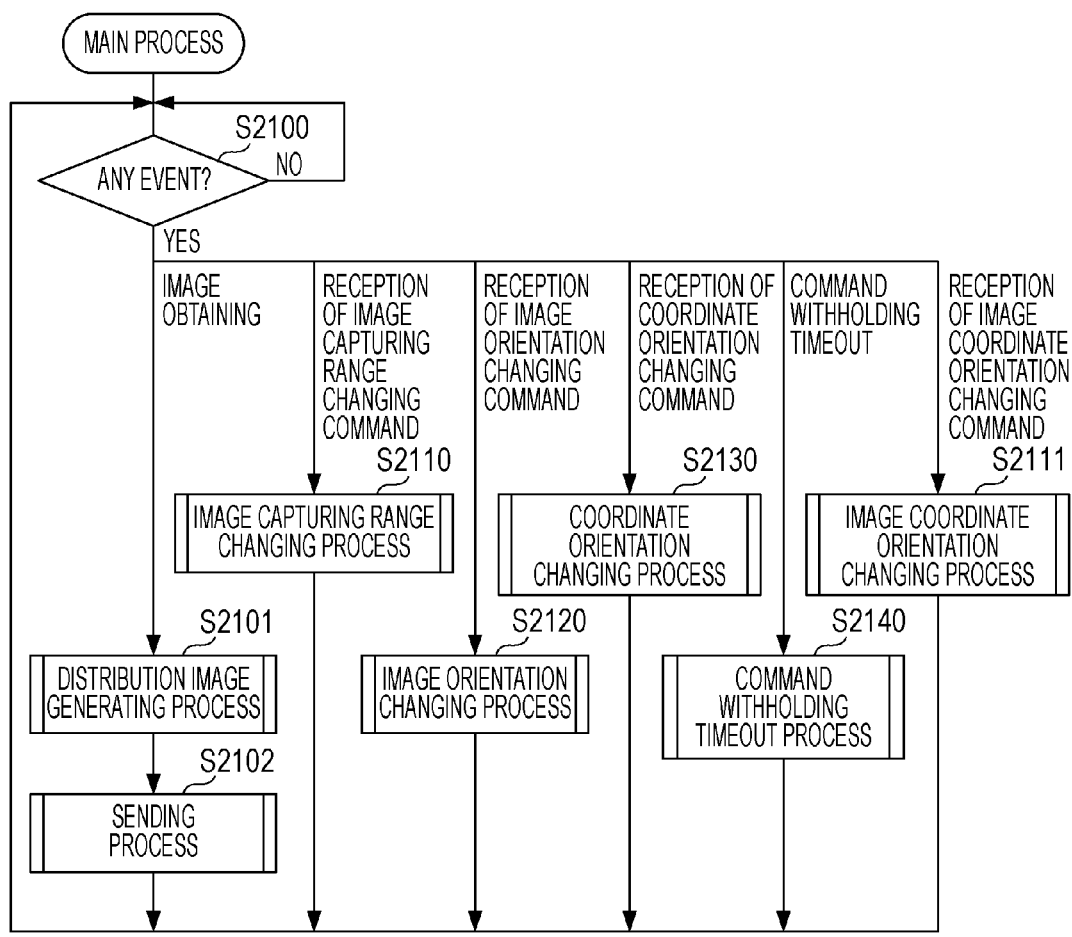
FIG. 9 is a flowchart for describing the operation of an image pickup apparatus according to a second embodiment.

A main process executed by the image pickup apparatus 2000 will be described using FIG. 9. At first, the control unit 1001 waits for an event (S2100). In the present embodiment, the image pickup apparatus 2000 determines that there is an event when an event of reception of the image coordinate orientation changing command occurs, besides an event of image obtaining, reception of the image capturing range changing command, reception of the image orientation changing command, reception of the coordinate orientation changing command, or command withholding timeout occurs.

When an image obtaining event occurs, the control unit 1001 of the image pickup apparatus 2000 executes a distribution image generating process (S2101). Regarding the distribution image generating process according to the present embodiment, a point different from the process described using FIG. 4A in the first embodiment will be described. In the present embodiment, in the distribution image generating process, when the image orientation parameter is OFF (normal orientation) (No in step S1200 in FIG. 4A), the control unit 1001 trims the captured image in accordance with the trimming parameter illustrated in FIG. 6B. Alternatively, when the image orientation parameter is ON (inverted orientation) (Yes in S1200), the control unit 1001 changes the image orientation in accordance with the image orientation parameter in step S1201 illustrated in FIG. 4A, and then trims the captured image in accordance with the trimming parameter. After trimming the captured image, the control unit 1001 overwrites the captured image stored in the memory 1002 with the trimmed captured image, and ends the distribution image generating process.

When the distribution image generating process ends, the control unit 1001 executes a sending process (S2102). In the sending process, the control unit 1001 sends, via the communication unit 1004, the distribution image, trimmed in the distribution image generating process in step S1101, to the client 3000 requesting video distribution from the image pickup apparatus 2000. After executing the sending process, the control unit 1001 returns to step S1100 and executes processing.

Alternatively, when the control unit 1001 receives the image capturing range changing command from the client 3000, the control unit 1001 executes an image capturing range changing process (S2110). In the present embodiment, the image capturing range changing command is used to change the range for cutting out an image in the image capturing range. Regarding the image capturing range changing process in the present embodiment, a point different from the process described using FIG. 4B in the first embodiment will be described. In the image capturing range changing process, after the control unit 1001 according to the present embodiment executes processing in step S1300 and step S1301 illustrated in FIG. 4B, the control unit 1001 calculates a trimming parameter in step S1302 in FIG. 4B. That is, when the obtained coordinate orientation parameter is ON (inverted orientation), the control unit 1001 inverts the coordinate system, as in the coordinates 1083 illustrated in FIG. 8, and determines the trimming range. In contrast, when the obtained coordinate orientation parameter is OFF (normal orientation), the control unit 1001 does not invert the coordinate system, as in the coordinates 1082 illustrated in FIG. 8, and determines the trimming range.

Then, the control unit 1001 in the present embodiment obtains the position of the trimming range at the coordinates in units of pixels. Coordinates 2082 and coordinates 2083 illustrated in FIG. 8 are coordinates having the lower-left vertex as the origin and being represented by the X coordinates and the Y coordinates in units of pixels. As indicated at the coordinates 2082 and the coordinates 2083 illustrated in FIG. 8, the control unit 1001 calculates, as a trimming parameter, two pixel-coordinate points (x1, y1) and (x2, y2) on the captured image, corresponding to two vertices defining the opposite angles of the determined trimming range. The control unit 1001 stores the calculated trimming parameter in the memory 1002. The control unit 1001 ends the image capturing range changing process.

Alternatively, when the control unit 1001 according to present embodiment receives the image orientation changing command from the client 3000, the control unit 1001 executes an image orientation changing process described later using FIG. 10A (S2120).

Figure 10B:
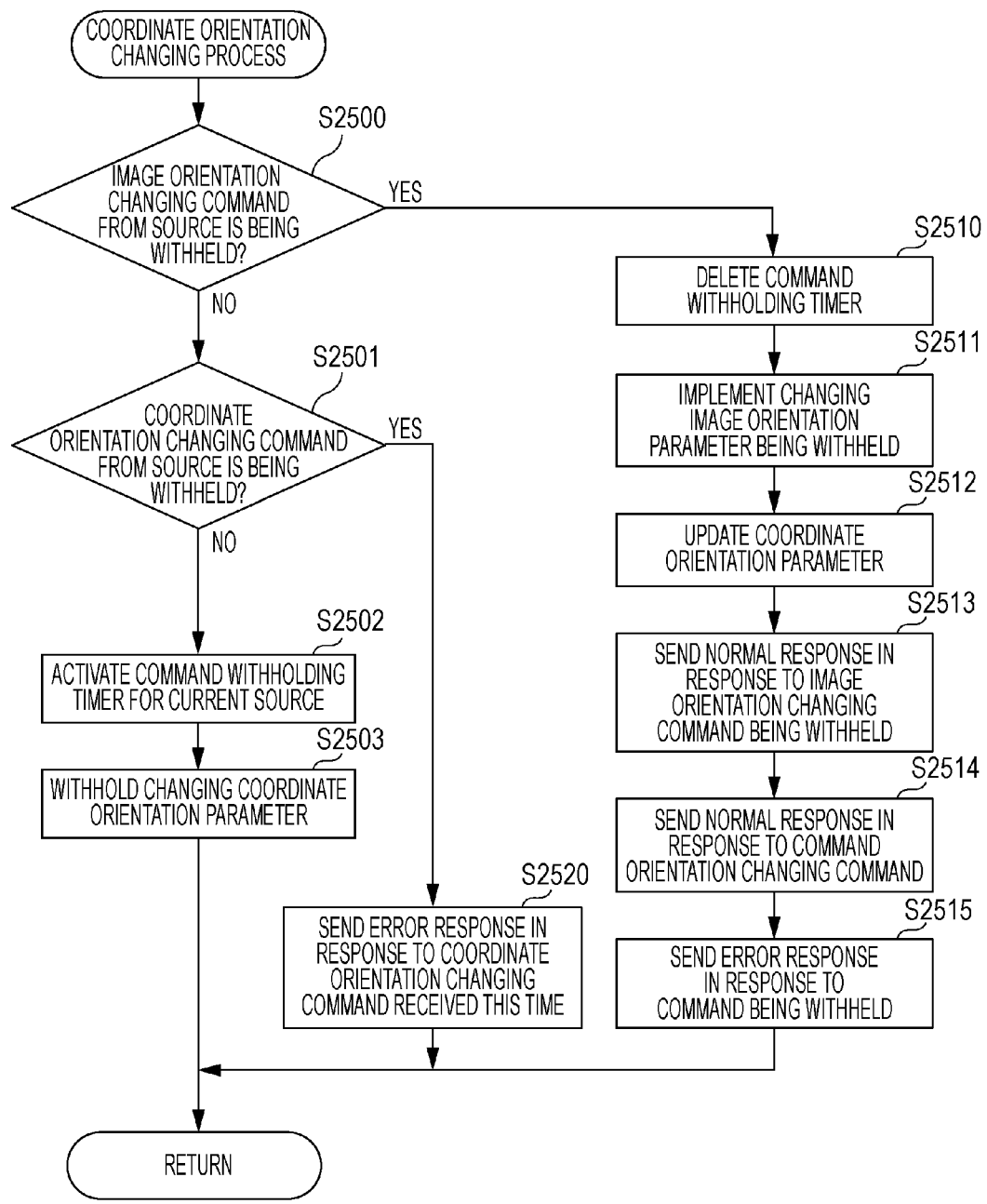
FIG. 10B is a flowchart for describing the details of the operation of the image pickup apparatus according to the second embodiment.

Alternatively, when the control unit 1001 according to the present embodiment receives the coordinate orientation changing command from the client 3000, the control unit 1001 executes a coordinate orientation changing process described later using FIG. 10B (S2130).

Alternatively, when a certain time period elapses after the received command has been withheld in the memory 1002, the control unit 1001 according to the present embodiment executes a command withholding timeout process (S2140).

Figure 10C:
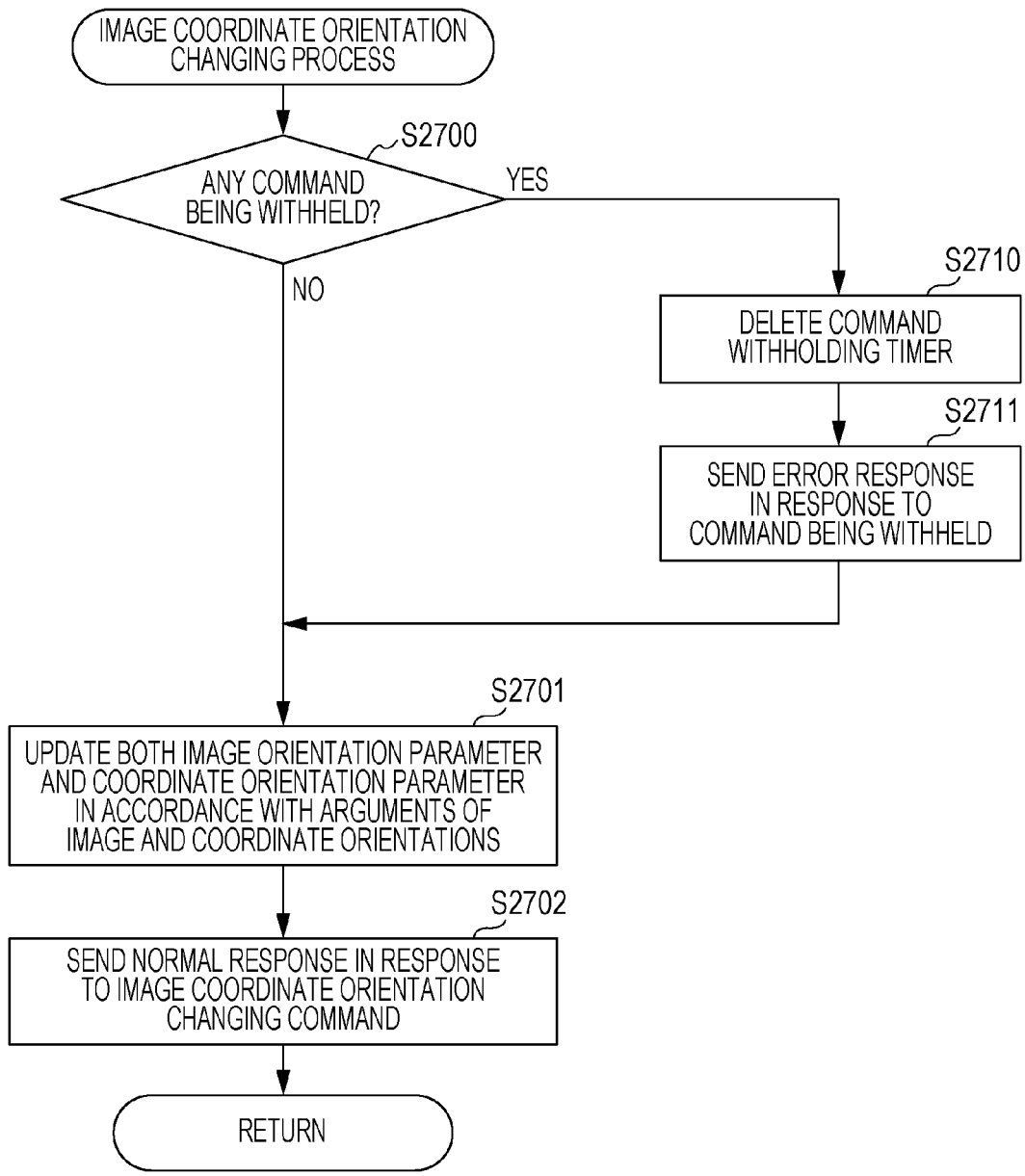
FIG. 10C is a flowchart for describing the details of the operation of the image pickup apparatus according to the second embodiment.

Alternatively, when the control unit 1001 according to the present embodiment receives the image coordinate orientation changing command illustrated in FIG. 5D from the client 3000, the control unit 1001 executes an image coordinate orientation changing process described later using FIG. 10C (S2111). After ending the processing in step S2111, the control unit 1001 returns to step S2100 and executes processing.

Next, the image orientation changing process in step S2120 will be described using FIG. 10A. At first, the control unit 1001 refers to the command withholding queue in the memory 1002 and determines whether the coordinate orientation changing command requested from the source client 3000 (hereinafter referred to as the current source) who has sent the withheld image orientation changing command is being withheld (S2400). When the coordinate orientation changing command from the current source is not being withheld (No in S2400), the control unit 1001 determines whether the image orientation changing command requested from the current source is being withheld (S2401). Determination in S2401 is performed by referring to the command withholding queue in the memory 1002. When the image orientation changing command is being withheld (Yes in S2401), the control unit 1001 sends an error response in response to the currently-received image orientation changing command (S2420).

While the execution of the image orientation changing command is being withheld, when the control unit 1001 receives the image orientation changing command again, the control unit 1001 does not execute the latter received image orientation changing command. In this manner, the image pickup apparatus 2000 according to the present embodiment can prevent overlapping execution of the image orientation changing command.

Alternatively, while the execution of the image orientation changing command is being withheld, when the control unit 1001 receives the image orientation changing command again, the control unit 1001 can refrain from executing the withheld image orientation changing command, and can withhold the execution of the latter received image orientation changing command until the coordinate orientation changing command is received. Also in this way, overlapping execution of the image orientation changing command can be prevented.

When the image orientation changing command from the current source is not being withheld (No in S2401), the control unit 1001 stores the argument of the received image orientation changing command, together with information indicating the source, in the command withholding queue, and withholds the execution of the image orientation changing command (S2402). The control unit 1001 uses the timing unit 1005 to activate a command withholding timer for the current source (S2403).

Upon receipt of the image orientation changing command as above, in a state where the control unit 1001 of the present embodiment has not received the coordinate orientation changing command from the client 3000 that has sent the image orientation changing command, the control unit 1001 withholds the execution of the image orientation changing command. Thus, the inconsistency between the coordinate orientation (normal orientation/inverted orientation) and the image orientation (normal orientation/inverted orientation) of the captured image, which is caused by changing only the image orientation (captured image 1072 illustrated in FIG. 7) while keeping the coordinate orientation unchanged (coordinates 2082 illustrated in FIG. 8), can be prevented.

In contrast, when the coordinate orientation changing command from the current source is being withheld in the memory 1002 (Yes in S2400), the control unit 1001 deletes the command withholding timer for the current source (S2410).

The control unit 1001 reads the argument of the coordinate orientation changing command, processing of which is being withheld and which has been sent from the current source, from the command withholding queue, and changes the coordinate orientation parameter in the memory 1002 (S2411).

Next, the control unit 1001 reads the argument of the currently-received image orientation changing command, and changes the image orientation parameter in the memory 1002 (S2412).

Next, the control unit 1001 sends, to the current source, a normal response illustrated in FIG. 5E in response to the withheld coordinate orientation changing command executed in step S2411 (S2413).

Next, the control unit 1001 sends, to the current source, a normal response in response to the image orientation changing command executed in step S2412 (S2414).

Then, the control unit 1001 refers to the command withholding queue and sends, to the individual sources, an error response illustrated in FIG. 5F in response to all the withheld commands (S2415).

When the control unit 1001 receives the image orientation changing command in a state in which the execution of the coordinate orientation changing command is being withheld in the memory 1002 as above, the control unit 1001 executes the coordinate orientation changing command and the image orientation changing command. Accordingly, the image pickup apparatus 2000 can output the captured image whose image orientation has been changed (captured image 1072 illustrated in FIG. 7), and change the image capturing range on the basis of the changed coordinates (coordinates 2083 illustrated in FIG. 8). Thus, the captured image can be output in a state in which the image orientation (normal orientation/inverted orientation) and the coordinate orientation (normal orientation/inverted orientation) match each other, and the image capturing range can be changed.

In this manner, the image pickup apparatus 2000 can execute the image orientation changing command while controlling the image capturing direction and the coordinate orientation to always match each other.

In the present embodiment, in steps S2400 and S2401, the control unit 1001 determines whether the command is a command from the current source. In this way, until both of the image orientation changing command and the coordinate orientation changing command are given from the same client 3000 to the image pickup apparatus 2000, execution of the former received command can be withheld. Accordingly, control to execute both commands while controlling the image orientation and the coordinate orientation to match each other can be executed for each client 3000.

Alternatively, in steps S2400 and S2401, the control unit 1001 may not determine whether the command is a command from the current source. In this case, when a pair of commands is given to the image pickup apparatus 2000, without making a distinction among the clients 3000, both commands are executed. Thus, even when plural clients 3000 give the image orientation changing command or the coordinate orientation changing command, the image pickup apparatus 2000 can execute both commands while controlling the image orientation and the coordinate orientation to match each other.

Next, the coordinate orientation changing process in step S2130 will be described using FIG. 10B. At first, the control unit 1001 refers to the command withholding queue in the memory 1002 and determines whether the image orientation changing command requested from the source of the currently-being-processed coordinate orientation changing command is being withheld (S2500). When the image orientation changing command from the current source is not being withheld (No in S2500), the control unit 1001 determines whether the coordinate orientation changing command requested from the current source is being withheld (S2501). Determination in step S2501 is performed by referring to the command withholding memory in the memory 1002. When the coordinate orientation changing command is being withheld (Yes in S2501), the control unit 1001 sends an error response in response to the currently-received coordinate orientation changing command (S2520). In this manner, the image pickup apparatus 2000 according to the present embodiment can prevent overlapping execution of the coordinate orientation changing command. Alternatively, an error response may be sent in response to the former received command, and the latter received command may be newly withheld. Even in this way, overlapping execution of the coordinate orientation changing command can be prevented.

When the coordinate orientation changing command from the current source is not being withheld (No in S2501), the control unit 1001 uses the timing unit 1005 to activate a command withholding timer for the current source (S2502).

The control unit 1001 stores the argument of the received coordinate orientation changing command, together with the current source, in the command withholding queue, and withholds the execution of the coordinate orientation changing command (S2503).

When the control unit 1001 receives the coordinate orientation changing command in a state in which no image orientation changing command has been received as above, the control unit 1001 withholds the execution of the coordinate orientation changing command. Thus, the inconsistency between the coordinate orientation (normal orientation/inverted orientation) and the image orientation (normal orientation/inverted orientation) of the captured image, which is caused by changing only the coordinate orientation (coordinates 2083 illustrated in FIG. 8) while keeping the image orientation unchanged (captured image 1071 illustrated in FIG. 7), can be prevented.

In contrast, when the image orientation changing command from the current source is being withheld in the memory 1002 (Yes in S2500), the control unit 1001 uses the timing unit 1005 to delete the command withholding timer for the current source (S2510).

The control unit 1001 reads the argument of the image orientation changing command, processing of which is being withheld and which has been sent from the current source, from the command withholding queue, and changes the image orientation parameter in the memory 1002 (S2511).

Next, the control unit 1001 reads the argument of the currently-received coordinate orientation changing command, and changes the coordinate orientation parameter in the memory 1002 (S2512).

Next, the control unit 1001 sends, to the current source, a normal response illustrated in FIG. 5E in response to the withheld image orientation changing command executed in step S2411 (S2513).

Next, the control unit 1001 sends, to the current source, a normal response in response to the coordinate orientation changing command executed in step S2512 (S2514).

Then, the control unit 1001 refers to the command withholding queue and sends, to the individual sources, an error response illustrated in FIG. 5F in response to all the withheld commands (S2515).

When the control unit 1001 receives the coordinate orientation changing command in a state in which the execution of the image orientation changing command is being withheld in the memory 1002 as above, the control unit 1001 executes the image orientation changing command and the coordinate orientation changing command. Accordingly, the image pickup apparatus 2000 can output the captured image whose image orientation has been changed (captured image 1072 illustrated in FIG. 7), and change the image capturing range on the basis of the changed coordinates (coordinates 2083 illustrated in FIG. 8). Thus, the captured image can be output in a state in which the image orientation (normal orientation/inverted orientation) and the coordinate orientation (normal orientation/inverted orientation) match each other, and the image capturing range can be changed.

In this manner, the image pickup apparatus 2000 can execute the coordinate orientation changing command while controlling the image orientation and the coordinate orientation to always match each other.

In the present embodiment, in steps S2500 and S2501, the control unit 1001 determines whether the command is a command from the current source. In this way, until both of the image orientation changing command and the coordinate orientation changing command are given from the same client 3000 to the image pickup apparatus 2000, execution of the former received command can be withheld. Accordingly, control to execute both commands while controlling the image orientation and the coordinate orientation to match each other can be executed for each client 3000.

Alternatively, in steps S2500 and S2501, the control unit 1001 may not determine whether the command is a command from the current source. In this case, when a pair of commands is given to the image pickup apparatus 2000, without making a distinction among the clients 3000, both commands are executed. Thus, even when plural clients 3000 give the image orientation changing command or the coordinate orientation changing command, the image pickup apparatus 2000 can execute both commands while controlling the image orientation and the coordinate orientation to match each other.

Next, the command withholding timeout process in step S2140 in the flow illustrated in FIG. 9 will be described. The control unit 1001 executes processing for a command in which withholding timeout has occurred, and sends a normal response. Alternatively, the control unit 1001 may not execute processing for a command in which withholding timeout has occurred, and may send an error response.

The operation in the case where the control unit 1001 executes processing for a command in which withholding timeout has occurred, and sends a normal response will be described.

The control unit 1001 refers to a timeout event from the timing unit 1005 and determines for which source the timeout has occurred. The control unit 1001 refers to the command withholding queue in the memory 1002, obtains a command from the determined source (current source) from among the withheld commands, and executes the obtained command. Then, the control unit 1001 sends, to the current source, a normal response in response to the executed command. The control unit 1001 ends the command withholding timeout process. In this way, even when the coordinate orientation and the image orientation of the captured image become inconsistent with each other due to the execution of a command, the command from the client 3000 can be executed as instructed, after a certain time period has elapsed.

Next, the operation in the case where the control unit 1001 does not execute processing for a command in which withholding timeout has occurred, and sends an error response will be described.

The control unit 1001 refers to a timeout event from the timing unit 1005 and determines for which source the timeout has occurred. The control unit 1001 refers to the command withholding queue in the memory 1002, and deletes, from the queue, a command from the determined source (current source) from among the withheld commands. Then, the control unit 1001 sends, to the current source, an error response in response to the deleted command. The control unit 1001 ends the command withholding timeout process. In this way, when the coordinate orientation and the image orientation of the captured image become inconsistent with each other due to the execution of a command, an execution of the command can be avoided.

Accordingly, from when one of the image orientation changing command and the coordinate orientation changing command is received from a client 3000 to when the other command is received from the client 3000, the control unit 1001 does not give a normal response to the client 3000. In this way, the user can more easily understand that the command is being withheld.

Next, the image coordinate orientation changing process will be described using FIG. 10C. At first, the control unit 1001 refers to the command withholding queue in the memory 1002 and determines whether there is a withheld command (S2700). When there is a withheld command (Yes in S2700), the control unit 1001 uses the timing unit 1005 to delete all the active command withholding timers (S2710). Then, the control unit 1001 sends, to the individual sources, an error response in response to all the commands withheld in the command withholding queue (S2711). The control unit 1001 moves the processing to step S2701 described later.

When there is no withheld command (No in S2700) or when the processing in step S2711 ends, the control unit 1001 executes processing in step S2701. In step S2701, the control unit 1001 updates both the image orientation parameter and the coordinate orientation parameter in the memory 1002 in accordance with the arguments of the image/coordinate orientations in the received image coordinate orientation changing command. Next, the control unit 1001 sends a normal response to the source of the image coordinate orientation changing command (S2702).

In this manner, when the control unit 1001 receives the image coordinate changing command while the execution of the image orientation changing command or the coordinate orientation changing command is being withheld, the control unit 1001 does not execute the withheld command, and executes the image coordinate orientation changing command.

Accordingly, the image pickup apparatus 2000 can output the captured image whose image orientation has been changed (captured image 1072 illustrated in FIG. 7), and change the image capturing range on the basis of the changed coordinates (coordinates 2083 illustrated in FIG. 8). Thus, the image pickup apparatus 2000 can output the captured image in a state in which the image orientation (normal orientation/inverted orientation) and the coordinate orientation (normal orientation/inverted orientation) match each other, and change the image capturing range.

With the above processing, the image pickup apparatus 2000 can prevent a state in which only one of the orientation of the image and the orientation of the coordinates of the image capturable range is changed. Also, the image pickup apparatus 2000 can appropriately process image orientation changing commands and coordinate orientation changing commands received from the plural clients 3000, and can send normal/error responses.

In the present amendment, processing in the case in which a normal response indicating that, in response to a command from one of the clients 3000, the command has been normally executed or an error response indicating that the command has not been executed is given has been described. Further, in the present embodiment, processing in the case in which the image coordinate orientation changing command is received from the client 3000 has been described. Such processing is not limited to the case in which the processing is applied to the image pickup apparatus 2000 with the so-called PTZ function, as in the present embodiment, and such processing is applicable to the image pickup apparatus 1000 described in the first embodiment.

Third Embodiment

In a third embodiment, a client application for causing the client 3000 to send the image orientation changing command illustrated in FIG. 5B or the coordinate orientation changing command illustrated in FIG. 5C to the image pickup apparatus 1000 will be described.

Figure 11A:
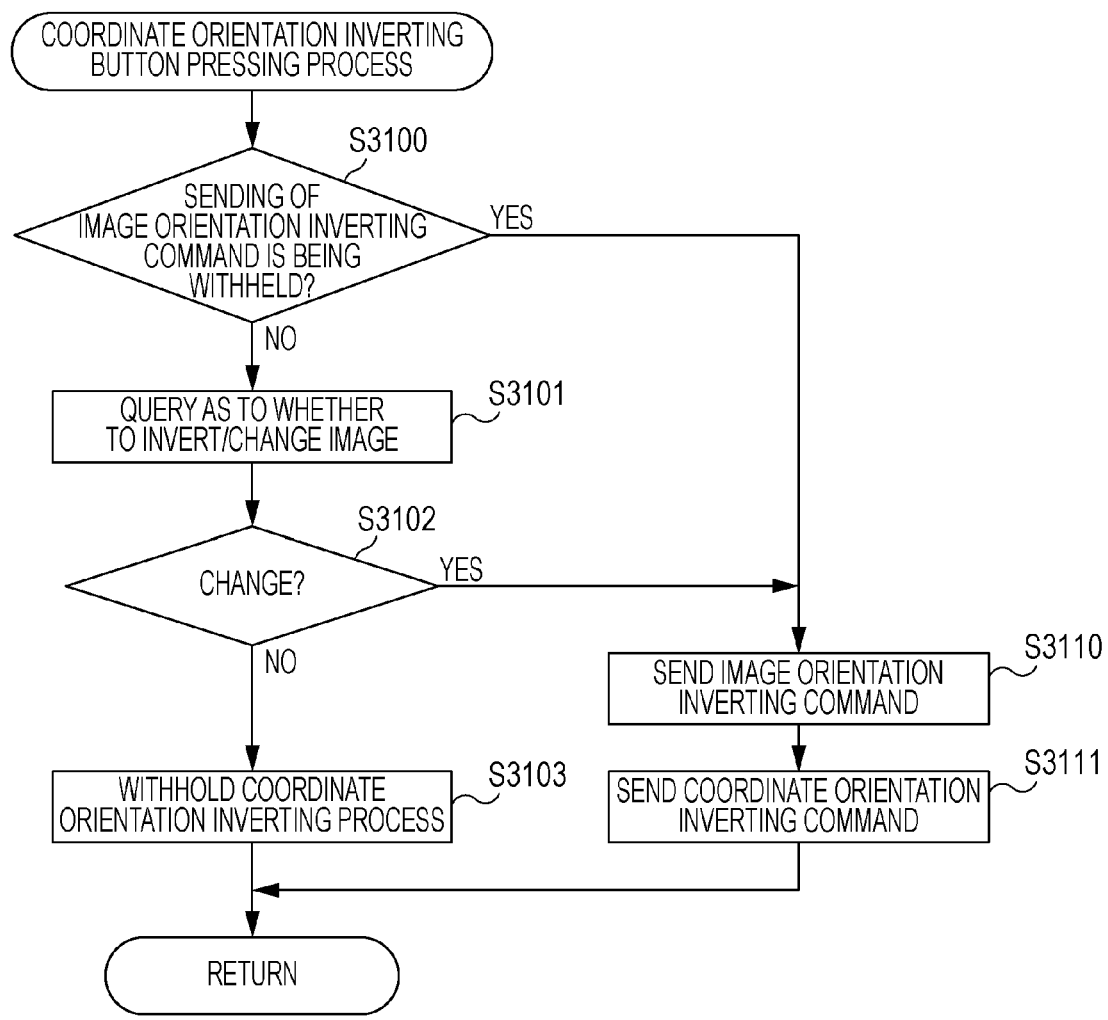
FIG. 11A is a flowchart for describing the operation of a control apparatus according to a third embodiment.
Figure 11B:
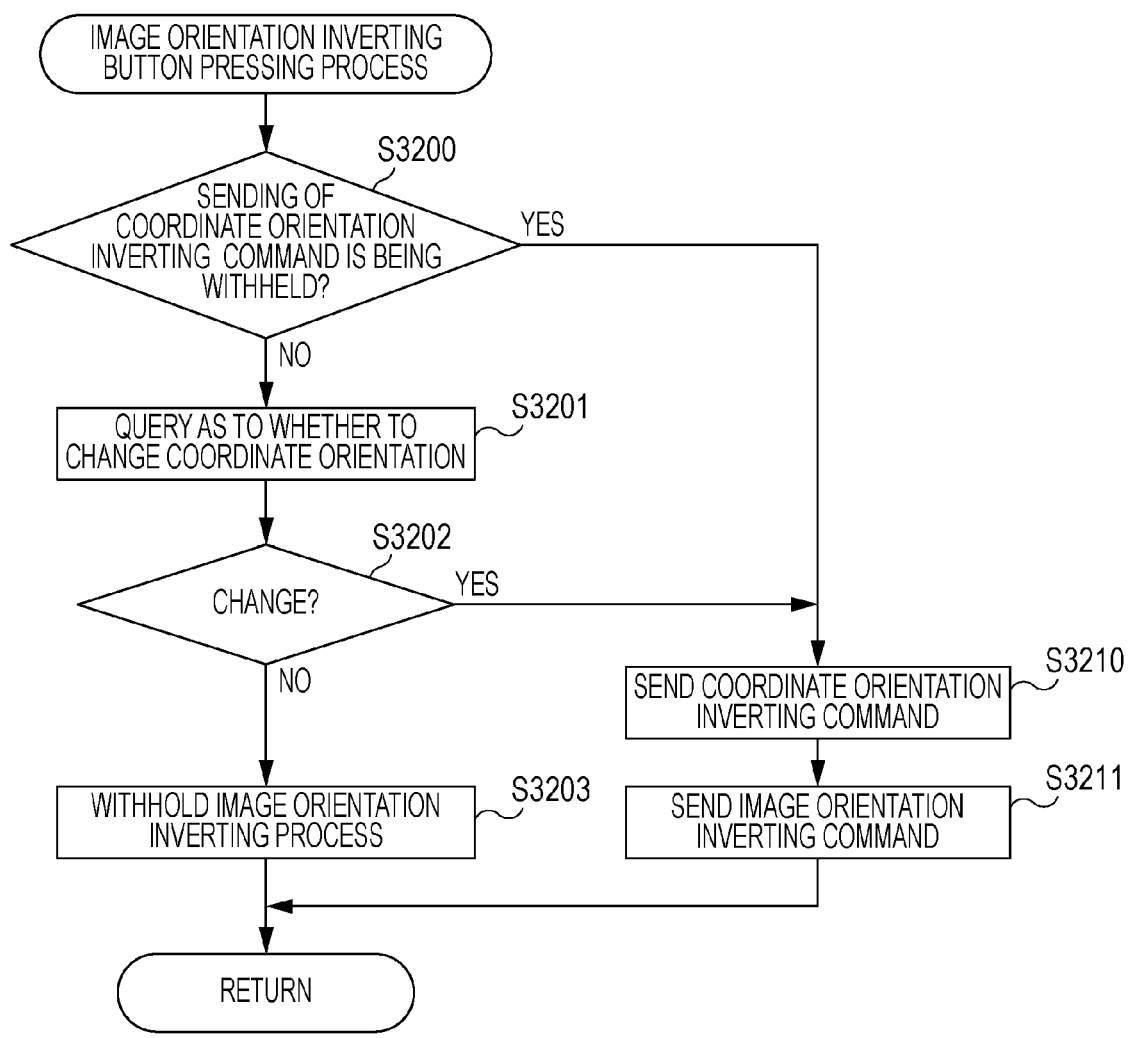
FIG. 11B is a flowchart for describing the operation of the control apparatus according to the third embodiment.

Processing executed when the client 3000 sends the coordinate orientation changing command or the image orientation changing command to the image pickup apparatus 1000 will be described using the flowcharts illustrated in FIGS. 11A and 11B. In a configuration in which the control unit 3001 of the client 3000 includes a processor, the processing flow illustrated in FIGS. 11A and 11B indicates a program for causing the control unit 3001 of the client 3000 to execute procedures illustrated in FIGS. 10A and 10B. The processor included in the control unit 3001 is a computer, and the processor executes a program read from the built-in memory 3002 included in the client 3000.

First, the case in which the client 3000 sends the coordinate orientation changing command to the image pickup apparatus 1000 will be described using FIG. 11A.

When the user gives the client 3000 an instruction to send the coordinate orientation changing command to the image pickup apparatus 1000, the control unit 3001 determines whether sending of an image orientation inverting command is being withheld (S3100). When sending of the image orientation inverting command is being withheld (Yes in S3100), the control unit 3001 sends the image orientation inverting command (S3110). Then, the control unit 3001 sends a coordinate orientation inverting command, and ends a coordinate orientation inverting button pressing process (S3111).

When sending of the image orientation inverting command is not being withheld (No in S3100), the control unit 3001 displays, on the display unit 3010, display for asking the user whether to invert the image orientation. The control unit 1001 can display, for example, the message "Invert the image orientation as well?" on the display unit 3010, and prompt the user to select Yes or No. Upon receipt of an instruction to invert the image (Yes in S3102), the above-described processing in S3110 and processing in step S3111 are executed.

In contrast, upon receipt of an instruction not to invert the image orientation (No in S3102), the control unit 3001 withholds sending of the coordinate orientation inverting command, and ends the coordinate orientation inverting button pressing process (S3103). In this case, the control unit 3001 may display, on the display unit 3010, notification indicating that sending of the coordinate orientation inverting command is withheld.

By performing the query in step S3102, the user is prompted to give commands so that the image orientation and the coordinate orientation of the image pickup apparatus 1000 match each other. In the query in step S3102, the user is asked whether to also give the image orientation changing command. Accordingly, commands in accordance with the user's intention can be given.

Next, the case in which the client 3000 sends the image orientation changing command to the image pickup apparatus 1000 will be described using FIG. 11B.

When the user gives the client 3000 an instruction to send the image orientation changing command to the image pickup apparatus 1000, the control unit 3001 determines whether sending of the coordinate orientation inverting command is being withheld (S3200). When sending of the coordinate orientation inverting command is being withheld (Yes in S3200), the control unit 3001 sends the coordinate orientation inverting command (S3210). Then, the control unit 3001 sends the image orientation inverting command, and ends the image orientation inverting button pressing process (S3211).

When sending of the coordinate orientation inverting command is not being withheld (No in S3200), the control unit 3001 displays, on the display unit 3010, display for asking the user whether to invert the coordinate orientation. The control unit 1001 can display, for example, the message "Invert the coordinate orientation as well?" on the display unit 3010, and prompt the user to select Yes or No. Upon receipt of an instruction to invert the coordinates (Yes in S3202), the above-described processing in S3210 and processing in step S3211 are executed.

In contrast, upon receipt of an instruction not to invert the coordinate orientation (No in S3202), the control unit 3001 withholds sending of the image orientation inverting command, and ends the image orientation inverting button pressing process (S3203). In this case, the control unit 3001 may display, on the display unit 3010, notification indicating that sending of the image orientation inverting command is withheld.

By performing the query in step S3202, the user is prompted to give commands so that the image orientation and the coordinate orientation of the image pickup apparatus 1000 match each other. In the query in step S3202, the user is asked whether to also give the coordinate orientation changing command. Accordingly, commands in accordance with the user's intention can be given.

In this manner, from reception of an instruction to send one of the image orientation inverting command and the coordinate orientation inverting command to the image pickup apparatus 1000 to reception of an instruction to send the other command to the image pickup apparatus 1000, the control unit 3001 withholds sending of the command specified in the instruction to be sent to the image pickup apparatus 1000. With the above processing, the client 3000 can prevent the image pickup apparatus 1000, serving as a target to be controlled, from entering a state in which one of the orientation of the image and the orientation of the coordinates of the image capturable range is changed. Therefore, when the user wishes to change the image capturing range while looking at a captured image distributed from the image pickup apparatus 1000, the image capturing range can be changed to the same orientation as that of the distributed captured image. Thus, changes in the image capturing range in accordance with the user's intention can be realized.

Other Embodiments

The embodiments are not limited to the above-described embodiments, and the embodiments may be partially changed. In the first embodiment or the second embodiment, while one of the commands illustrated in FIGS. 5B and 5C from a certain client 3000 is being withheld, when one of the commands is received from a different client 3000, these commands are similarly withheld. However, this case is not the only case. Alternatively, an error response may be sent to a command from a different client 3000, and plural commands may not be withheld. In this way, from reception of one of the image orientation changing command and the coordinate orientation changing command from a first client 3000 to reception of the other command from the first client 3000, the control unit 1001 can be configured not to execute a command received from a second client 3000. Accordingly, from when the image orientation changing command is sent from the first client 3000 to when the coordinate orientation changing command is executed, a command from the second client 3000 is prevented from being executed, and hence changes not intended by the user of the first client 3000 are avoided. Thus, the first client 3000 can surely give a pair of the image orientation changing command and the coordinate orientation changing command to the image pickup apparatus 1000. Accordingly, the image pickup apparatus 1000 can always output the captured image in a state in which the image orientation and the coordinate orientation match each other, and can change the image capturing range.

Also, in the first to third embodiments, the case in which the interfaces for changing the image orientation and the coordinate orientation specify one of the normal orientation/inverted orientation has been described. However, the embodiments are not limited to the above case. An interface capable of specifying rotation every 90 degrees or every degree may be used.

Also in the first to third embodiments, upon receipt of both the image orientation changing command and the coordinate orientation changing command, both of the commands are executed without determining the orientation specified in each of the commands. However, this case is not the only case. Alternatively, both of the commands may be processed only when the orientation specified in the former withheld command matches the orientation specified in the latter received command. In this case, when the orientation specified in the withheld command does not match the orientation specified in the latter received command, an error response may be sent to the latter command.

The present invention may also be realized by executing the following processing. That is, the processing is such that software (program) realizing the functions of the above-described embodiments is supplied to a system or an apparatus via a network or various storage media, and a computer (or a CPU, an MPU, etc.) in the system or the apparatus reads and executes the program.

According to the present invention, even when an image pickup apparatus independently receives a command for changing the orientation of a captured image to be displayed at a control apparatus and a command for changing the orientation of the coordinate system used for controlling the image capturing direction of the image pickup apparatus, the image capturing direction can be changed to a direction intended by a user.

Also, according to the present invention, even when a control apparatus independently sends a command for changing the orientation of a captured image to be displayed at the control apparatus and a command for changing the orientation of the coordinate system used for controlling the image capturing direction of an image pickup apparatus, the image capturing direction can be changed to a direction intended by a user.

The present invention is not restricted to the above-described embodiments, and various changes and modifications can be made without departing from the spirit and scope of the present invention. Thus, the following claims are appended to provide the scope of the invention to the public.

This application claims the benefit of International Patent Application No. PCT/JP2011/076148, filed Nov. 14, 2011, which is hereby incorporated by reference herein in its entirety.

The invention claimed is:

1. An image pickup apparatus comprising:
   image pickup means;
   holding means for holding a coordinate system used to represent an image capturing direction of the image pickup means;
   reception means for receiving a first command for rotating a captured image obtained by the image pickup means by a certain angle, a second command for rotating the coordinate system held in the holding means about the origin by the certain angle, and specification information for specifying the image capturing direction in the coordinate system;
   change control means for executing control to change the image capturing direction of the image pickup means to the image capturing direction specified by the specification information; and
   control means for withholding, from when the reception means receives one of the first command and the second command to when the reception means receives the other of the first command and the second command, execution of the first command or the second command received by the reception means.

2. The image pickup apparatus according to claim 1, wherein, when the reception means does not receive the other of the first command and the second command even when a certain time period has elapsed since reception of one of the first command and the second command, the control means does not execute the first command or the second command received by the reception means.

3. The image pickup apparatus according to claim 1, wherein, when the reception means does not receive the other of the first command and the second command even when a certain time period has elapsed since reception of one of the first command and the second command, the control means executes the first command or the second command received by the reception means.

4. The image pickup apparatus according to claim 1, wherein, while the control means is withholding execution of the first command or the second command, when the reception means receives a third command whose contents are the same as those of the withheld command, the control means does not execute the third command.

5. The image pickup apparatus according to claim 1, wherein, while the control means is withholding execution of the first command or the second command, when the reception means receives a third command whose contents are the same as those of the withheld command, the control means does not execute the withheld first command or second command, and withholds execution of the third command until the other of the first command and the second command is received.

6. The image pickup apparatus according to claim 1, wherein, from reception of one of the first command and the second command to reception of the other of the first command and the second command from a control apparatus, the reception means does not give the control apparatus a response for indicating that the received first command or second command is normally executed.

7. The image pickup apparatus according to claim 1, wherein the reception means receives commands from a plurality of control apparatuses, and
   wherein, from when the reception means receives one of the first command and the second command from a first control apparatus to when the reception means receives the other of the first command and the second command from the first control apparatus, a command received from a second control apparatus is not executed.

8. The image pickup apparatus according to claim 1, wherein, while the control means is withholding execution of the first command or the second command, upon receipt of a fourth command for executing a command for rotating the captured image by a certain angle and a command for rotating the coordinate system about the origin by the certain angle, the control means does not execute the withheld command, and executes the fourth command.

9. An image pickup apparatus comprising:
   image pickup means;
   holding means for holding a coordinate system used to represent a region in an image capturing range of the image pickup means;
   reception means for receiving a first command for rotating a captured image cut out from the region in the image capturing range by a certain angle, a second command for rotating the coordinate system held in the holding means about the origin by the certain angle, and specification information for specifying, in the coordinate system, a region for cutting out the captured image from the image capturing range;
   cut-out means for cutting out the captured image in the region in the coordinate system, the region being specified by the specification means; and
   control means for withholding, from when the reception means receives one of the first command and the second command to when the reception means receives the other of the first command and the second command, execution of the first command or the second command received by the reception means.

10. A control apparatus for controlling an image pickup apparatus including holding means for holding a coordinate system used to represent an image capturing direction of image pickup means, the control apparatus comprising:

specification means for specifying an image capturing direction in the coordinate system; and sending control means for executing control to send, to the image pickup apparatus, a first command for rotating a captured image obtained by the image pickup means in the image capturing direction specified by the specification means by a certain angle, and a second command for rotating the coordinate system held in the holding means about the origin by the certain angle, wherein, from when the sending control means receives an instruction to send one of the first command and the second command to the image pickup apparatus to when the sending control means receives an instruction to send the other of the first command and the second command to the image pickup apparatus, the sending control means withholds sending of the command specified in the instruction to be sent to the image pickup apparatus.

11. A control apparatus for controlling an image pickup apparatus including holding means for holding a coordinate system used to represent a region in an image capturing range of image pickup means, the control apparatus comprising:

specification means for specifying a region in the coordinate system; and sending control means for executing control to send, to the image pickup apparatus, a first command for rotating a captured image in the region in the image capturing range in accordance with the region in the coordinate system, the region being specified by the specification means, by a certain angle, and a second command for rotating the coordinate system held in the holding means about the origin by the certain angle, wherein, from when the sending control means receives an instruction to send one of the first command and the second command to the image pickup apparatus to when the sending control means receives an instruction to send the other of the first command and the second command to the image pickup apparatus, the sending control means withholds sending of the command specified in the instruction to be sent to the image pickup apparatus.

12. An image pickup method comprising:

a holding step of holding, by holding means, a coordinate system used to represent an image capturing direction of image pickup means;

a reception step of receiving, by reception means, a first command for rotating a captured image obtained by the image pickup means by a certain angle, a second command for rotating the coordinate system held in the holding step about the origin by the certain angle, and specification information for specifying the image capturing direction in the coordinate system;

a change control step of executing, by change control means, control to change the image capturing direction of the image pickup means to the image capturing direction specified by the specification information; and a control step of withholding, by control means, from when one of the first command and the second command is received in the reception step to when the other of the first command and the second command is received in the reception step, execution of the first command or the second command received by the reception means.

13. A non-transitory computer readable storage medium which retrievably stores a computer program that causes a computer to execute the image pickup method defined in claim 12.

14. An image pickup method comprising:

a holding step of holding, by holding means, a coordinate system used to represent a region in an image capturing range of image pickup means;

a reception step of receiving, by reception means, a first command for rotating a captured image cut out from the region in the image capturing range by a certain angle, a second command for rotating the coordinate system held in the holding step about the origin by the certain angle, and specification information for specifying, in the coordinate system, a region for cutting out the captured image from the image capturing range;

a cut-out step of cutting out, by cut-out means, the captured image in the region in the coordinate system, the region being specified by the specification information; and a control step of withholding, by control means, from when one of the first command and the second command is received in the reception step to when the other of the first command and the second command is received in the reception step, execution of the first command or the second command received by the reception means.

15. A control method for an image pickup apparatus including holding means for holding a coordinate system used to represent an image capturing direction of image pickup means, the control method comprising:

a specification step of specifying, by specification means, an image capturing direction in the coordinate system; and a sending control step of executing, by sending control means, control to send, to the image pickup apparatus, a first command for rotating a captured image obtained by the image pickup means in the image capturing direction specified in the specification step by a certain angle, and a second command for rotating the coordinate system held in the holding means about the origin by the certain angle, wherein, in the sending control step, from reception of an instruction to send one of the first command and the second command to the image pickup apparatus to reception of an instruction to send the other of the first command and the second command to the image pickup apparatus, the sending control means executes control to withhold sending of the command specified in the instruction to be sent to the image pickup apparatus.

16. A non-transitory computer readable storage medium which retrievably stores a computer program that causes a computer to execute the control method defined in claim 15.

17. A control method for an image pickup apparatus including holding means for holding a coordinate system used to represent a region in an image capturing range of image pickup means, the control method comprising:

a specification step of specifying, by specification means, a region in the coordinate system; and a sending control step of executing, by sending control means, control to send, to the image pickup apparatus, a first command for rotating a captured image in the region in the image capturing range in accordance with the region in the coordinate system, the region being specified in the specification step, by a certain angle, and a second command for rotating the coordinate system held in the holding means about the origin by the certain angle, wherein, in the sending control step, from reception of an instruction to send one of the first command and the second command to the image pickup apparatus to reception of an instruction to send the other of the first command and the second command to the image pickup apparatus, the sending control means executes control to withhold sending of the command specified in the instruction to be sent to the image pickup apparatus.

* * * * *